United States Patent
Alfarhan et al.

(10) Patent No.: US 12,193,019 B2
(45) Date of Patent: Jan. 7, 2025

(54) METHODS, APPARATUS AND SYSTEMS FOR ENHANCED UPLINK DATA TRANSMISSION ON CONFIGURED GRANTS

(71) Applicant: InterDigital Patent Holdings, Inc., Wilmington, DE (US)

(72) Inventors: Faris Alfarhan, Montreal (CA); J. Patrick Tooher, Montreal (CA); Aata El Hamss, Laval (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 382 days.

(21) Appl. No.: 17/606,551

(22) PCT Filed: Apr. 30, 2020

(86) PCT No.: PCT/US2020/030583
§ 371 (c)(1),
(2) Date: Oct. 26, 2021

(87) PCT Pub. No.: WO2020/223420
PCT Pub. Date: Nov. 5, 2020

(65) Prior Publication Data
US 2022/0210823 A1    Jun. 30, 2022

Related U.S. Application Data

(60) Provisional application No. 62/885,565, filed on Aug. 12, 2019, provisional application No. 62/840,499, filed on Apr. 30, 2019.

(51) Int. Cl.
*H04W 72/23*    (2023.01)
*H04L 1/1867*    (2023.01)

(52) U.S. Cl.
CPC ............ *H04W 72/23* (2023.01); *H04L 1/188* (2013.01)

(58) Field of Classification Search
CPC ...... H04W 72/23; H04L 1/188; H04L 1/1819; H04L 1/1822; H04L 1/1864; H04L 1/1874; H04L 1/1883; H04L 1/1887
See application file for complete search history.

(56) References Cited

U.S. PATENT DOCUMENTS

| 2013/0301611 A1 | 11/2013 | Baghel et al. |
| 2017/0373803 A1 | 12/2017 | Wu |

(Continued)

FOREIGN PATENT DOCUMENTS

| CN | 109075952 A | 12/2018 |
| JP | 2019036777 A | 3/2019 |

(Continued)

OTHER PUBLICATIONS

"New WID on NR-based Access to Unlicensed Spectrum", 3GPP Tdoc RP-182878, TSG RAN #82, Sorrento, Italy, Dec. 10-13, 2018, 8 pages.

(Continued)

*Primary Examiner* — Sudesh M Patidar
(74) *Attorney, Agent, or Firm* — VOLPE KOENIG

(57) ABSTRACT

Methods, apparatus and systems are disclosed. In one representative method, a wireless transmit and receive unit (WTRU) may receive information associated with one or more configured grants (CGs), may select a first CG corresponding to a first CG configuration, and may transmit, on a CG occasion associated with the first CG, a transport block (TB) using resources associated with the first CG. The WTRU may also start a CG timer for the first CG responsive to a transmission of the TB, and receive a HARQ Acknowledgement (ACK) indication indicating a HARQ-ACK feed- (Continued)

back value and associated with a HARQ Process ID (PID) in Downlink Feedback Information (DFI) of Downlink Control Information (DCI). In this representative method, after reception of the HARQ ACK indication and on condition that a HARQ-ACK feedback value is equal to ACK, the WTRU may stop the CG timer and may flush a HARQ buffer associated with the HARQ PID.

12 Claims, 12 Drawing Sheets

(56) References Cited

U.S. PATENT DOCUMENTS

| | | | |
|---|---|---|---|
| 2018/0176903 A1 | 6/2018 | Lee et al. | |
| 2018/0270854 A1 | 9/2018 | Lee et al. | |
| 2019/0074936 A1 | 3/2019 | Lee et al. | |
| 2019/0097765 A1* | 3/2019 | Jose | H04W 24/08 |
| 2019/0149274 A1 | 5/2019 | Freda et al. | |
| 2019/0150180 A1* | 5/2019 | Zou | H04W 72/21 |
| | | | 370/329 |
| 2019/0223035 A1 | 7/2019 | You et al. | |
| 2020/0039531 A1 | 2/2020 | Fushimi et al. | |
| 2020/0351832 A1* | 11/2020 | Baek | H04W 72/04 |
| 2020/0374748 A1* | 11/2020 | Ahn | H04L 1/1822 |
| 2020/0383089 A1 | 12/2020 | Goto et al. | |
| 2021/0345397 A1* | 11/2021 | Li | H04L 1/1896 |
| 2022/0052790 A1* | 2/2022 | Lei | H04L 1/1607 |
| 2022/0158777 A1* | 5/2022 | Göktepe | H04L 1/188 |
| 2022/0183075 A1* | 6/2022 | Jiang | H04W 74/008 |

FOREIGN PATENT DOCUMENTS

| | | |
|---|---|---|
| RU | 2628489 C2 | 8/2017 |
| TW | 201801550 A | 1/2018 |
| WO | 2017/047875 A1 | 3/2017 |
| WO | 2018/058387 A1 | 4/2018 |
| WO | 2018/173855 A1 | 9/2018 |
| WO | 2018171964 A1 | 9/2018 |
| WO | WO 2019030726 A1 | 2/2019 |

OTHER PUBLICATIONS

3rd Generation Partnership Project; Technical Specification Group Radio Access Network; NR; Physical layer procedures for control (Release 15); 3GPP TS 38.213 V15.3.0 (Sep. 2018); 101 pages.
3rd Generation Partnership Project; Technical Specification Group Radio Access Network; Evolved Universal Terrestrial Radio Access (E-UTRA); Physical layer procedures (Release 15); 3GPP TS 36.213 V15.0.0 (Dec. 2017); 493 pages.
Huawei et al., "Transmission with configured grant for NR-U", 3GPP Tdoc R2-1904958, 3GPP RAN WG2 Meeting 105bis, Xian, China, Apr. 8-12, 2019, 5 pages.
Nokia, et al., "Configured grant timer(s) for NR-U", 3GPP Tdoc R2-1903713, 3GPP TSG-RAN WG2 Meeting #105bis, Kian, China, Apr. 8-12, 2019, 2 pages.
ZTE Corporation, "Considerations on Configured Grant for NR-U", 3GPP Tdoc R2-1903539; 3GPP TSG RAN WG2 NR #105bis Meeting, Xi'an, China, Apr. 8-Apr. 12, 2019, 3 pages.
3rd Generation Partnership Project; Technical Specification Group Radio Access Network; NR; Medium Access Control (MAC) protocol specification (Release 15); 3GPP TS 38.321 V15.1.0 (Mar. 2018); 67 pages.
3rd Generation Partnership Project; Technical Specification Group Radio Access Network; Study on NR Industrial Internet of Things (IOT); (Release 16); 3GPP TR 38.825 V16.0.0 (Mar. 2019); 33 pages.
3rd Generation Partnership Project; Technical Specification Group Radio Access Network; Evolved Universal Terrestrial Radio Access (E-UTRA); Medium Access Control (MAC) protocol specification (Release 15); 3GPP TS 36.321 V15.6.0 (Jun. 2019); 133 pages.
3rd Generation Partnership Project; Technical Specification Group Radio Access Network; NR; Radio Resource Control (RRC) protocol specification (Release 15); 3GPP TS 38.331 V15.4.0 (Dec. 2018); 142 pages.
LTE; Evolved Universal Terrestrial Radio Access (E-UTRA); Radio Resource Control (RRC); Protocol specification (3GPP TS 36.331 version 15.6.0 Release 15); ETSI TS 136 331 V15.6.0 (Jul. 2019); 965 pages.
3rd Generation Partnership Project; Technical Specification Group Radio Access Network; Study on NR-based access to unlicensed spectrum (Release 16); 3GPP Tr 38.889 V16.0.0 (Dec. 2018); 114 pages.
Huawei et al., "Transmission with configured grant in NR unlicensed band", 3GPP Tdoc R1-1805922, 3GPP TSG RAN WG1 Meeting #93, Busan, Korea, May 21-May 25, 2018, 7 pages.
3rd Generation Partnership Project; Technical Specification Group Radio Access Network; NR; Physical layer procedures for data (Release 15); 3GPP TS 38.214 V15.6.0 (Jun. 2019); 105 pages.
Ericsson., "Enhanced HARQ feedback lode in SPS", 3GPP Tdoc R2-1704684, 3GPP TSG-RAN WG2 #98, Hangzhou, P.R. of China, May 15, 2017, 3 pages.
Liu et al., "A Solution to Reduce HARQ Process Delay in Unlicensed Spectrum", Science Technology and Engineering, vol. 17, No. 10, Apr. 2017, 5 pages.
Zhang et al., "Solution of HARQ timing collision in dynamic TDD technology", China Academic Journal Electronic Publishing House, Telecommunications Science No. 5, 2017, 9 pages.

* cited by examiner

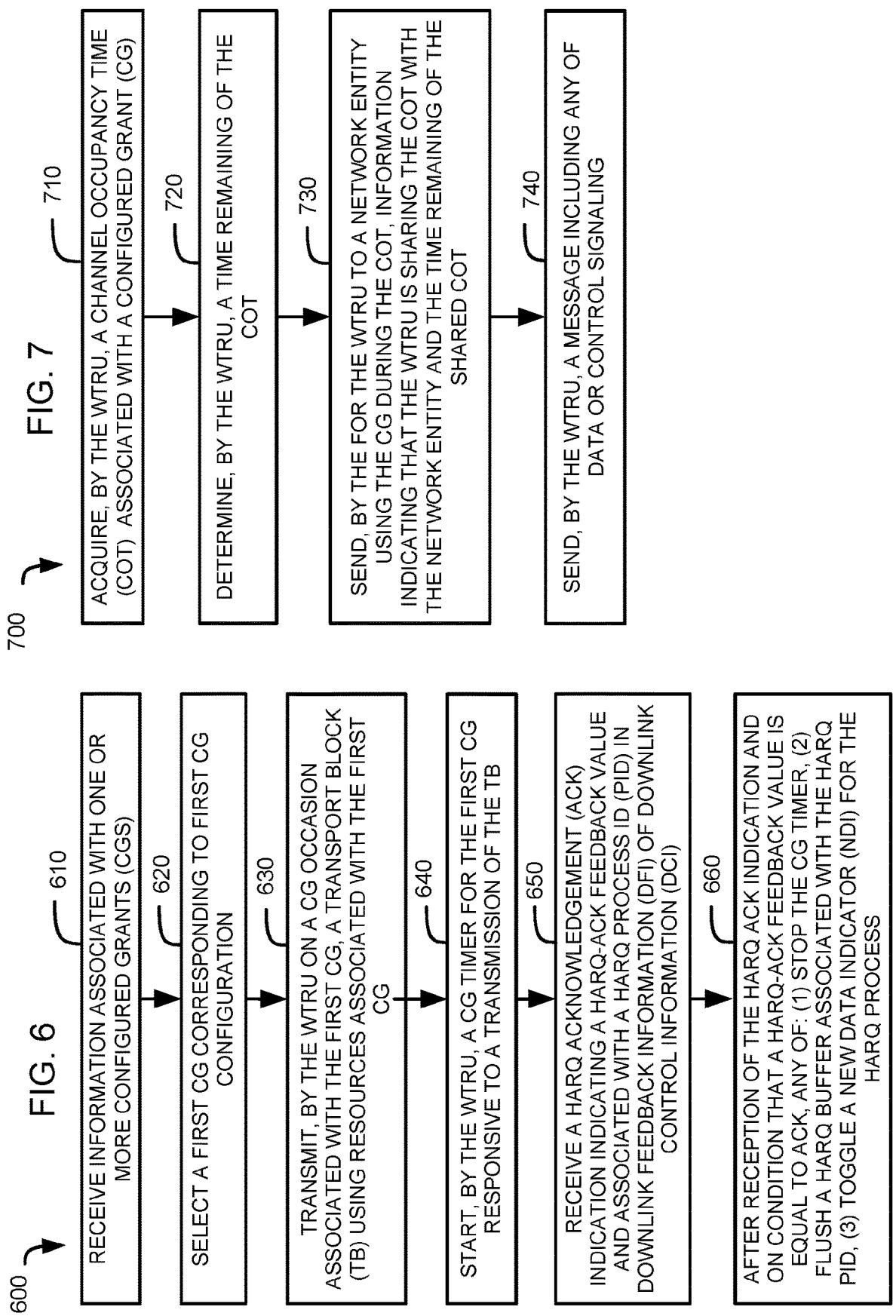

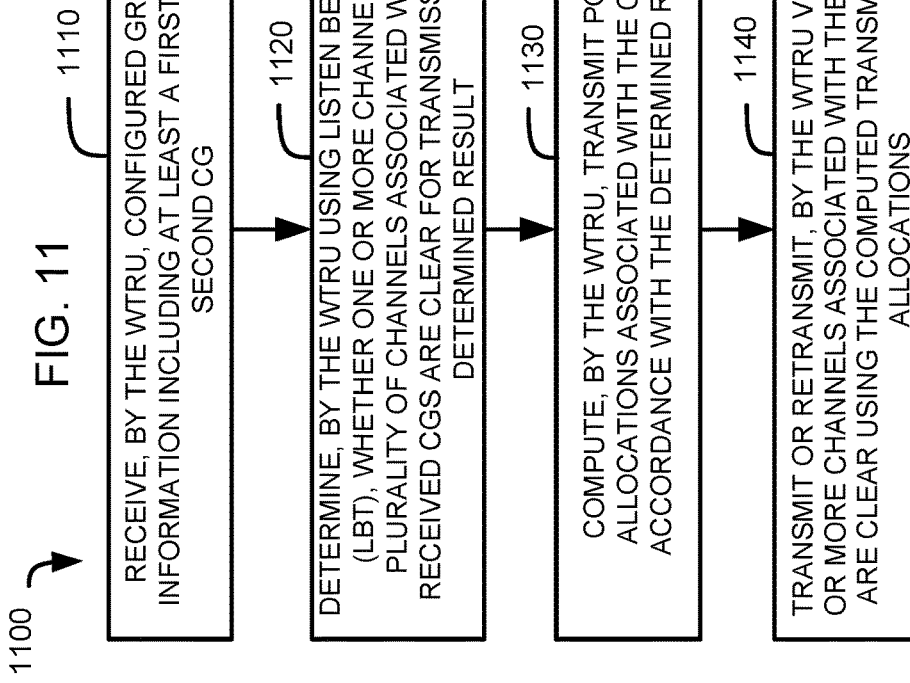
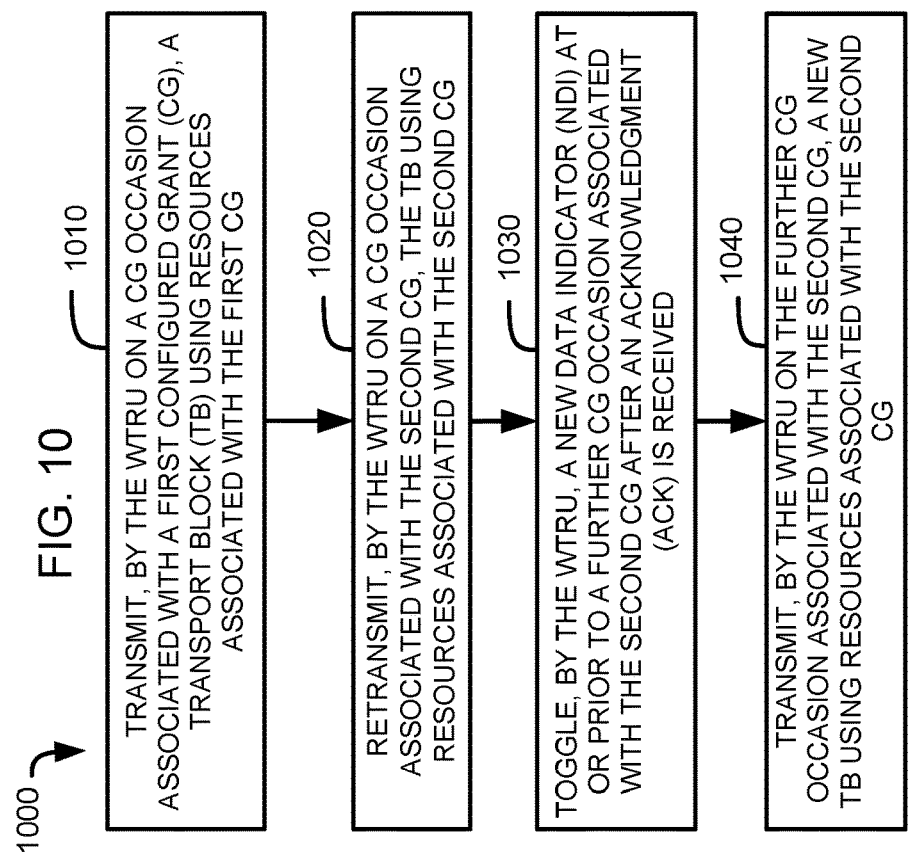

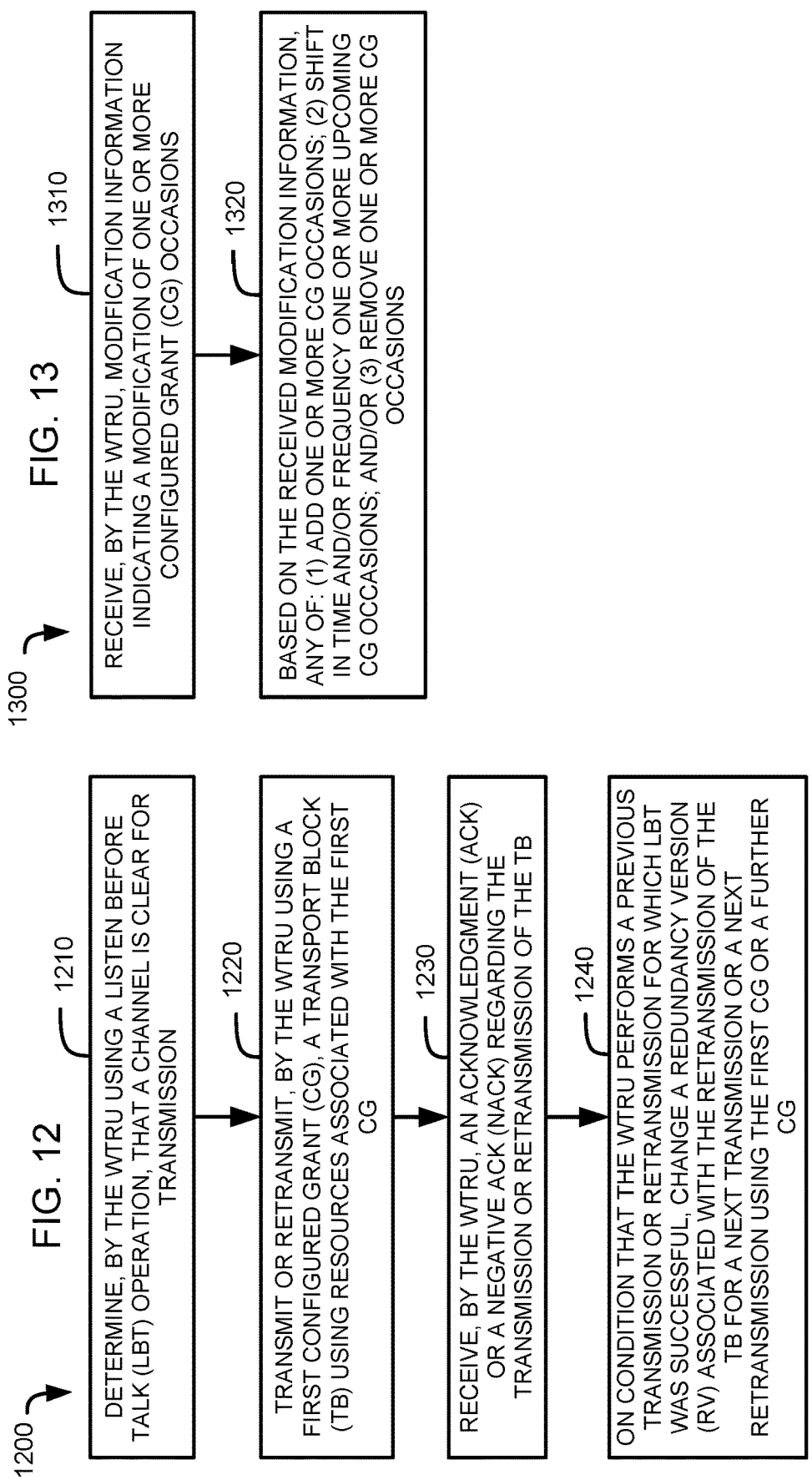

- 1510: RECEIVE, BY THE WTRU FROM A NETWORK ENTITY, A CONFIGURED GRANT (CG) FOR UPLINK RESOURCES
- 1520: FOR A SLOT, MAP, BY THE WTRU, CG UPLINK CONTROL INFORMATION CG-UCI AND DATA TO THE UPLINK RESOURCES FOR A CG TRANSMISSION
- 1530: SEND, BY THE WTRU TO THE NETWORK ENTITY, THE CG TRANSMISSION, THE UPLINK RESOURCES ASSOCIATED WITH THE CG-UCI BEING TRANSMITTED PRIOR TO THE UPLINK RESOURCES ASSOCIATED WITH THE DATA

- 1410: RECEIVE OR OBTAIN, BY THE WTRU, A PLURALITY OF CONFIGURED GRANT (CG) CONFIGURATIONS ASSOCIATED WITH A PLURALITY OF CG OCCASIONS AND A PLURALITY OF CG RESOURCES
- 1420: DETERMINE, BY THE WTRU USING LISTEN BEFORE TALK (LBT), WHETHER ONE OR MORE CHANNELS OF A PLURALITY OF CHANNELS ASSOCIATED WITH THE RECEIVED CGS ARE CLEAR FOR TRANSMISSION, AS AN LBT DETERMINED RESULT
- 1430: SELECT A SUBSET OF THE CG CONFIGURATIONS, THE CG OCCASIONS AND/OR THE CG RESOURCES BASED ON THE LBT DETERMINED RESULT, JITTERING DELAY TO A NEXT CG OCCASION OR NEXT CG OCCASIONS, AND/OR A RECEPTION OF OR A LACK OF RECEPTION OF A DOWNLINK SIGNAL

METHODS, APPARATUS AND SYSTEMS FOR ENHANCED UPLINK DATA TRANSMISSION ON CONFIGURED GRANTS

CROSS REFERENCE

This application is a § 371 U.S. National Stage entry of PCT Application No. PCT/US2020/030583, filed Apr. 30, 2020, which is a non-provisional filing of, and claims the benefit of U.S. Provisional Patent Application Nos. 62/840, 499, filed on Apr. 30, 2019, and 62/885,565, filed on Aug. 12, 2019, the contents of each of which are hereby incorporated by reference herein.

FIELD

Embodiments disclosed herein generally relate to wireless communications and, for example to methods, apparatus and systems for enhanced uplink (UL) data transmission on configured grants.

RELATED ART

A Listen-Before-Talk (LBT) mechanism may be used for Channel Access (CA) in an unlicensed frequency bands.

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 6 is a flowchart illustrating a further representative procedure for transmission of a transport block;

FIG. 7 is a flowchart illustrating a representative procedure for COT sharing;

FIG. 10 is a flowchart illustrating a still further representative procedure for transmission of a transport block;

FIG. 11 is a flowchart illustrating a representative transmission procedure using computed transmit power allocations;

FIG. 12 is a flowchart illustrating a representative procedure for changing a redundancy version;

FIG. 13 is a flowchart illustrating a representative procedure for modification of CG occasions;

FIG. 14 is a flowchart illustrating a representative procedure for CG configuration, CG occasion and/or CG resource selection; and FIG. 15 is a flowchart illustrating a representative procedure for a CG transmission.

DETAILED DESCRIPTION

Example Networks for Implementation of the Embodiments

Figure 1A:
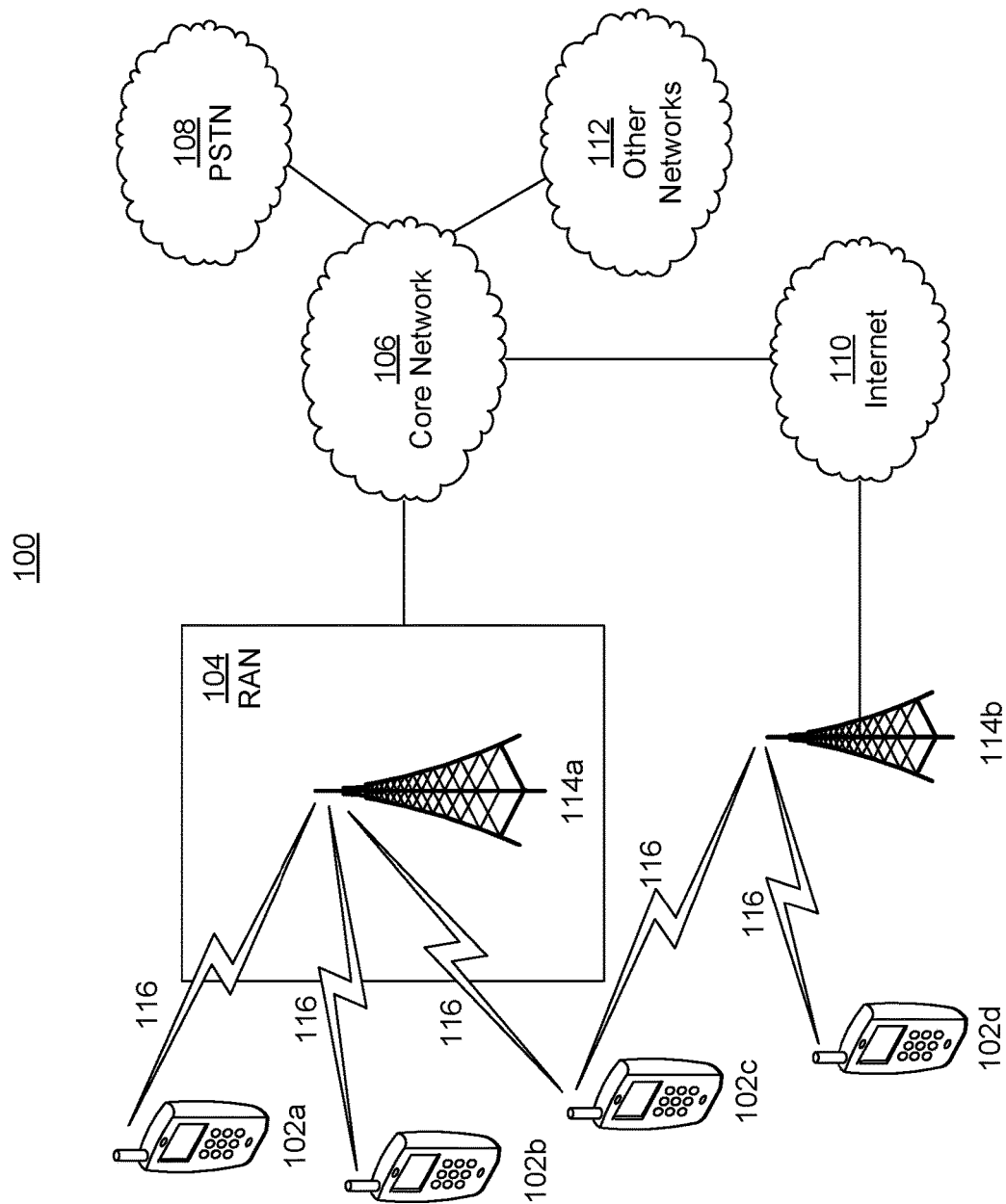
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B (eNB), a Home Node B (HNB), a Home eNode B (HeNB), a gNB, a NR Node B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
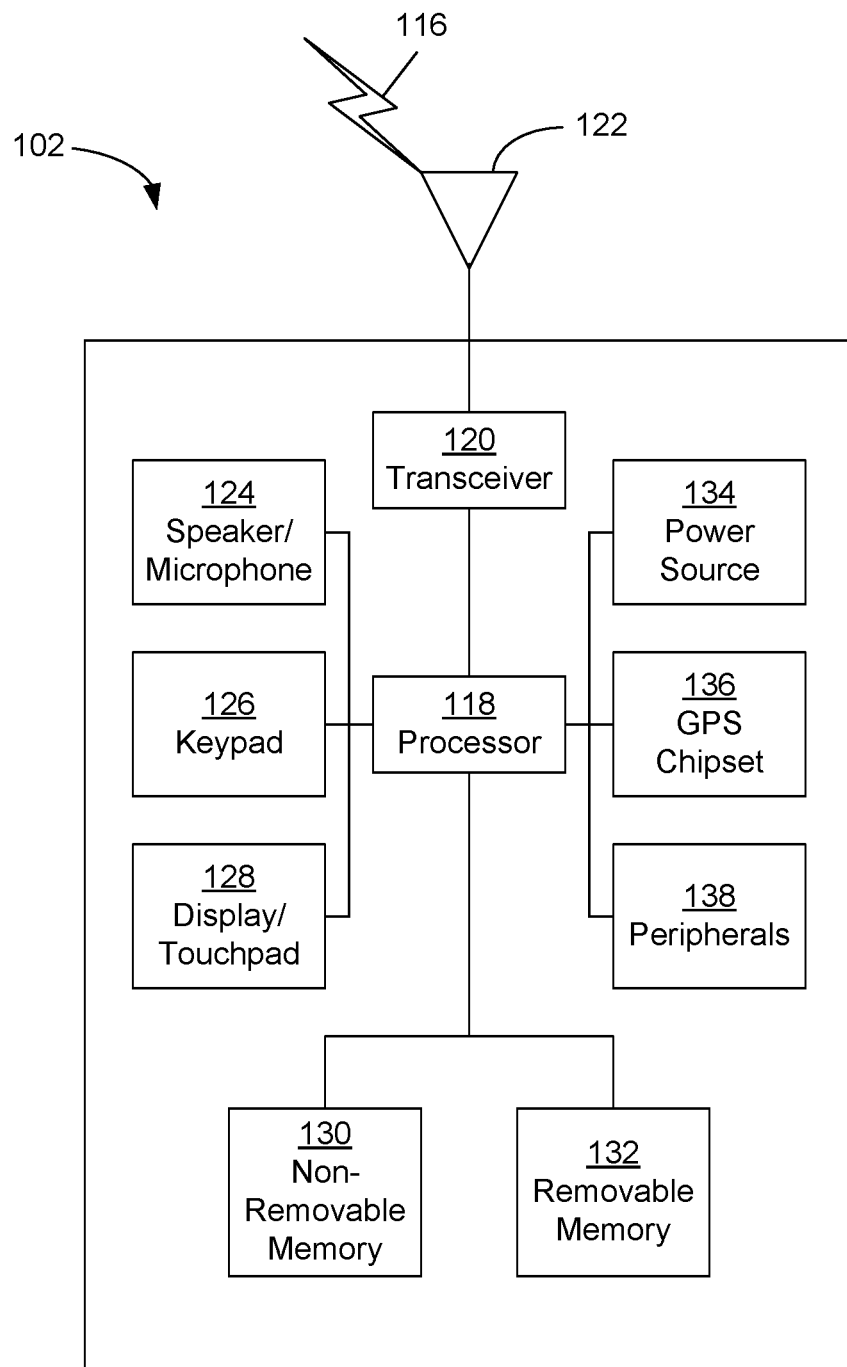
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The processor 118 of the WTRU 102 may operatively communicate with various peripherals 138 including, for example, any of: the one or more accelerometers, the one or more gyroscopes, the USB port, other communication interfaces/ports, the display and/or other visual/audio indicators to implement representative embodiments disclosed herein.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
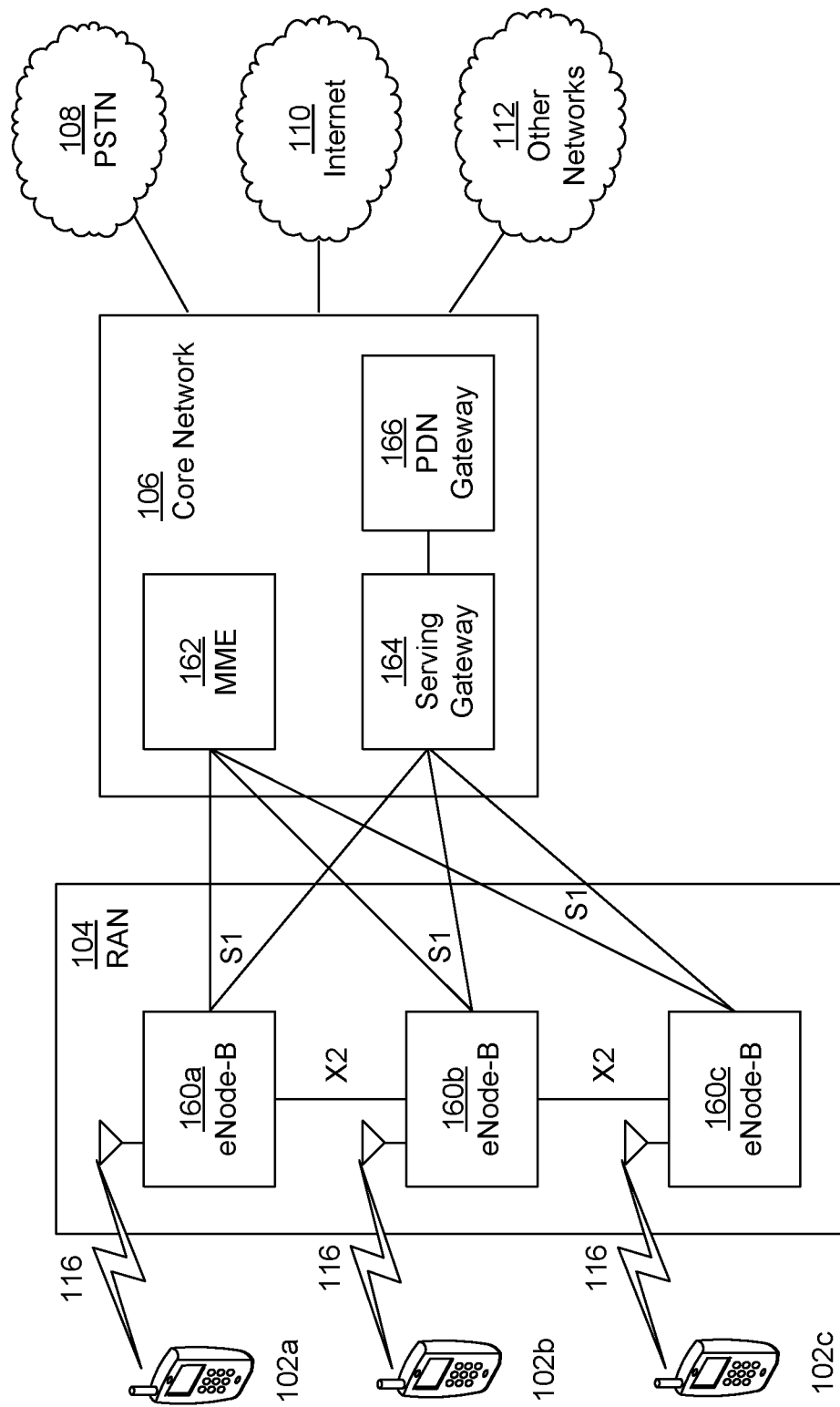
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode Bs 160a, 160b, 160c, though it will be appreciated that the RAN 104 may include any number of eNode Bs while remaining consistent with an embodiment. The eNode Bs 160a, 160b, 160c may each include one or more transceivers for communicating with the WTRUs 102a, 102b, 102c over the air interface 116. In one embodiment, the eNode Bs 160a, 160b, 160c may implement MIMO technology. Thus, the eNode B 160a, for example, may use multiple antennas to transmit wireless signals to, and/or receive wireless signals from, the WTRU 102a.

Each of the eNode Bs 160a, 160b, 160c may be associated with a particular cell (not shown) and may be configured to handle radio resource management decisions, handover decisions, scheduling of users in the UL and/or DL, and the like. As shown in FIG. 1C, the eNode Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11 af and 802.11 ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11 ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11 ah is 6 MHz to 26 MHz depending on the country code.

Figure 1D:
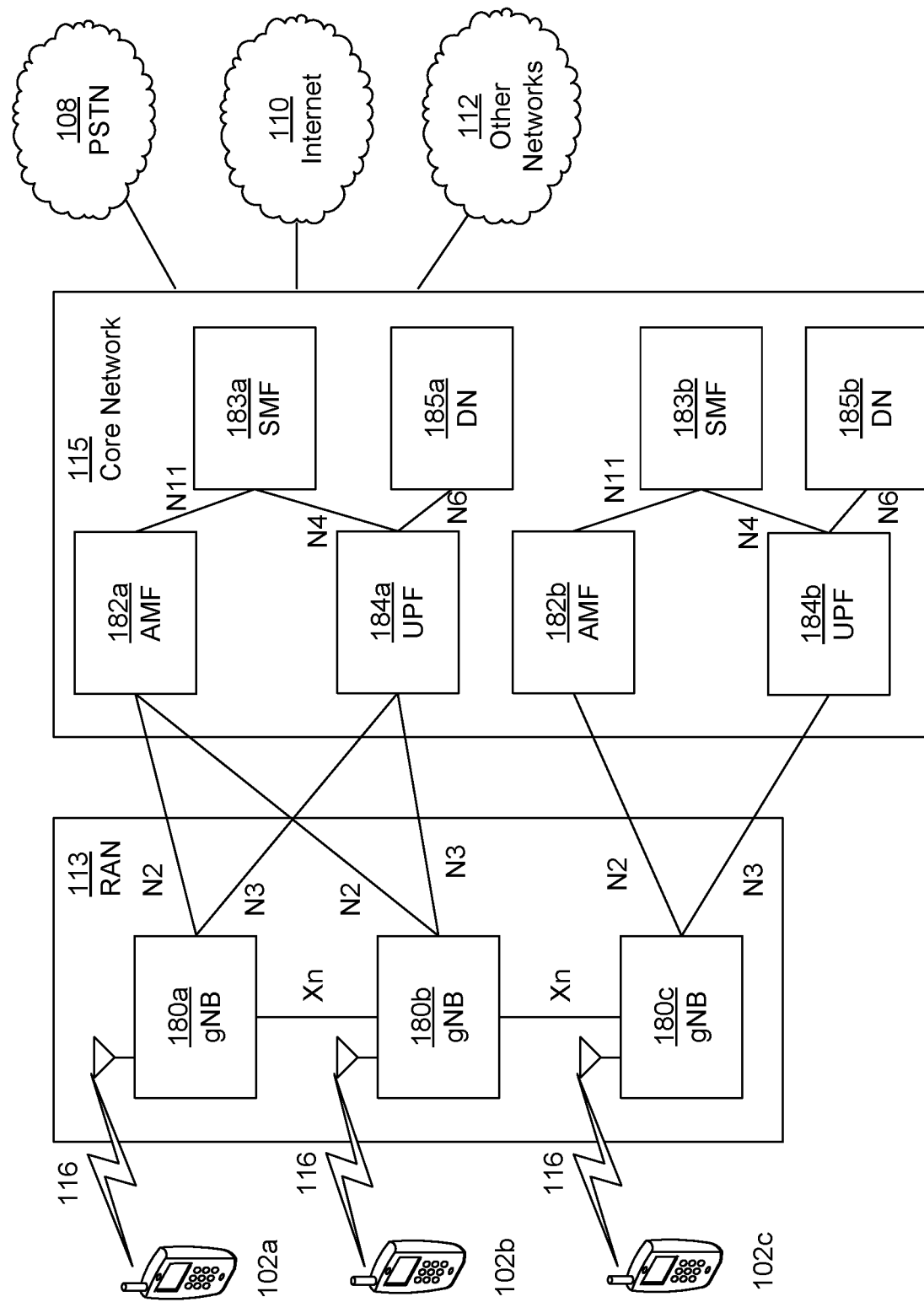
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum.

In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode Bs 160a, 160b, 160c. For example, WTRUs 102a, 102b, 102c may implement DC principles to communicate with one or more gNBs 180a, 180b, 180c and one or more eNode Bs 160a, 160b, 160c substantially simultaneously. In the non-standalone configuration, eNode Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different Protocol Data Unit (PDU) sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address (e.g., a WTRU IP address), managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In some cases, LBT may be mandated (e.g., is typically mandated) independently of whether the channel is occupied or not. In other cases, immediate transmission after short switching gap may be applied.

In certain representative embodiments, a channel may be a contiguous portion of a frequency band and in other representative embodiments, a channel may be multiple non-contiguous portions of one or more frequency bands. In the context of unlicensed frequency bands, a channel may be the spectrum resources determined by the LBT mechanism/operation to be available for communication.

For frame-based systems, LBT may be characterized by a Clear Channel Assessment (CCA) time (e.g., in the range of ~20 μs), a Channel Occupancy time (COT) (e.g., minimum 1 ms, maximum 10 ms), an idle period (e.g., minimum 5% of COT), a fixed frame period (e.g., equal to the COT+idle period), a short control signaling transmission time (e.g., maximum duty cycle of 5% within an observation period of 50 ms), and/or a CAA energy detection threshold.

For load-based systems (e.g., a transmit/receive structure may not be fixed in time), LBT may be characterized by a number N corresponding to the number of clear idle slots in extended CCA, for example, instead of the fixed frame period. N may be selected (e.g., selected randomly) within a range.

For unlicensed spectrum, there may be a plurality of categories (e.g., two categories) of CCA for UL and/or DL. In the first category, a node may sense the channel for N slot durations, where N is a value (e.g., a random value) selected from a range of allowed values (sometime hereafter referred to as a Contention Window CW)). Size of the CW and/or adjustments to the CW may depend on channel access priority (CAP). In a License Assisted Access (LAA) mode, a WTRU 102 may operate using CA with at least one carrier on a licensed spectrum. In an enhanced Licensed Assisted Access (FeLAA) mode, a WTRU 102 may autonomously transmit using Autonomous UL (AUL) Transmissions on a preconfigured active UL Semi-Persistent Scheduling (SPS) resource, for which Hybrid Automatic Repeat Request (HARQ) feedback (e.g., explicit HARQ feedback) may be provided on via the DFI.

New Radio (NR) systems may support flexible transmission duration within a slot and/or a "configured grant" type-1 for UL transmissions. For example, the network (e.g., a network entity) may semi-statically configure an UL grant and the WTRU 102 may autonomously use the configured UL grant without a layer 1 (L1) (e.g., physical layer) indication and/or activation. A configured grant type-2 may be similar to a configured grant type-1 and may consider the L1 indication/activation. NR systems may support DL SPS resources (and/or DL configured grants) on which the WTRU 102 may receive DL data on active DL CGs with no scheduling used and/or necessary for each DL Transport Block (TB).

NR systems may support UL and DL services with different QoS requirements within a single WTRU 102, including traffic with varying latency and/or reliability requirements. NR may support time-sensitive communications and/or networking, including deterministic and/or non-deterministic Time-Sensitive Networking (TSN) traffic patterns and/or flows, for example, which can be used (e.g., be prevalent) in factory automation settings using licensed and/or unlicensed spectrum.

NR-based operations using unlicensed spectrum may include initial access operation, Scheduling/HARQ, and/or mobility operations, along with coexistence operations with LTE-LAA and other incumbent Radio Access Technologies (RATs). Deployment scenarios may include standalone NR-based operations, dual connectivity operations (e.g., E-UTRA NR Dual-Connectivity (EN-DC) with at least one carrier operating according to the LTE RAT or NR DC with at least two sets of one or more carriers operating according to the NR RAT, and/or different variants of carrier aggregation (e.g., including different combinations of zero or more carriers of each of LTE and/or NR RATs). NR-U may support CG transmissions as well as Code Block Group (CBG) based transmissions for the CG.

The term "LBT configuration" and/or the term "LBT parameter" may be generally used to encompass at least one or more of: a CAP class (CAPC), an LBT category, a congestion window size, a CCA, and/or other parameters used to determine whether the WTRU 102 is able to acquire a channel or to transmit an UL signal on the channel. The term "highest priority CAPC" is generally synonymous with a lowest CAPC number and/or a lowest CAPC. The term "UL LBT failure" generally implies that the WTRU 102 was not able to acquire the channel for an UL transmission attempt after a CCA part of an LBT procedure, which for example may be determined based on receiving a "notification of LBT failure" or "indication of LBT failure" from a physical layer, among other determination operations. The opposite may apply when the term "UL LBT success" is used. For example, the term "UL LBT success" generally implies that the WTRU 102 was able to acquire the channel for an UL transmission attempt, for example after the CCA part of the LBT procedure.

The terms "AUL timer", "CG retransmission timer", and "AUL retransmission timer" may be used interchangeably. The terms "LBT sub-band" and "LBT bandwidth" may be used interchangeably.

In Further Enhanced Licensed-Assisted Access (FeLAA) systems, the WTRU 102 may not generate a retransmission until an AUL timer has expired and HARQ feedback is not received, or until a negative ACK (NACK) is received in DFI. For NR-unlicensed (NR-U) systems, the WTRU 102 may maintain the AUL timer or a retransmission timer to control retransmissions on active CG(s), in addition to or in lieu of a legacy timer (e.g., a NR-R15 CG timer). The AUL timer may be started when the TB is transmitted on the CG and may be stopped upon reception of the HARQ feedback in the Downlink Feedback Information (DFI) and/or upon reception of a Dynamic Grant (DG) for the same HARQ process. Upon expiry of the AUL timer, the WTRU 102 may determine (e.g., may assume) that there is a NACK for the TB previously transmitted on the CG, and that the WTRU 102 is allowed to attempt another transmission or retransmission on an active configured grant with the same HARQ Process ID (HARQ PID).

In certain representative embodiments, the WTRU 102 may stop a CG timer and may toggle the New Data Indicator (NDI) upon receiving a HARQ ACK in Downlink Feedback Information (DFI) for an applicable HARQ Process ID (PID).

In certain representative embodiments, the WTRU 102 may update the CG timer value for the applicable HARQ PID according to a periodicity of a selected CG occasion for a retransmission.

In certain representative embodiments, the WTRU 102 may backoff for a period prior to selecting a first available CG occasion, dependent on the selected CG and/or receiving an indication from the gNB 180.

In certain representative embodiments, the WTRU 102 may increment an RV only after a transmission or retransmission on which LBT was successful on a CG.

In certain representative embodiments, the WTRU 102 may select or reselect a different CG resource on a different sub-band for a retransmission or for a re-attempt of a transmission after a number of LBT failure(s).

In certain representative embodiments, the WTRU 102 may compute several transmit power allocations (TPAs) and may apply one TPA depending on the LBT outcome on different uplinks and/or the uplink subband(s) on which LBT or CCA was successful.

In certain representative embodiments, the WTRU 102 may determine that an upcoming CG occasion is conditionally added or shifted upon receiving an indication from the gNB 180.

In certain representative embodiments, the WTRU 102 may conditionally consider a subset of CG occasions, CG configurations, and/or CG resources as applicable based on LBT outcome, a jittering delay to the next one or more CG occasions, and/or a reception of a DL signal or a lack of such a reception of a DL signal, for example based on a timer expiry. Jittering delay is for example the time delay between the data arrival (e.g., at the data buffer) and the next transmission occasion.

In certain representative embodiments, methods, apparatus and systems may be implemented to include CG-UCI in a CG transmission. For example, such embodiments may include a determination of resources in which to map the CG-UCI and/or include multiplexing of the CG-UCI, UCI and data in one or more CG resources.

In NR-U, the WTRU 102 may be configured with multiple CGs on a given Bandwidth Part (BWP), a subset or all of which may be active simultaneously. Depending on an LBT outcome, a subset of the active CGs may be used at a given time.

In certain representative embodiments, methods, apparatus, systems and/or procedures for generating a transmission or a retransmission on the CGs in the context of NR-U may be implemented, for example to provide a predictable WTRU behavior. The methods, apparatus, systems and/or procedures, for example, may consider the impact of and/or may impact: (1) LBT and transmission timing on resource selection, 2) Redundant Version (RV) selection, (3) CAPC selection, (4) HARQ PID selection, (5) power allocation, and/or (5) one or more retransmission timers, among others.

Representative Procedures for Retransmission on CGs

Representative Conditions for Generating a Retransmission on a CG

The WTRU 102 may maintain a CG timer (e.g., a legacy NR-R15 CG timer) per active HARQ PID, for example used for AUL. The CG timers may be maintained in addition to or in lieu of an AUL timer. Upon reception of a DG with a HARQ PID used for a pending CG re-transmission, the WTRU 102 may restart one or more CG timers and may stop the AUL timer. In FeLAA, the AUL timer may be configured in subframes (unit of ms) and the CG timer, for example in NR-R15, may be configured with a unit of number of CG periodicities. For NR-U systems, the AUL timer may expire while the CG timer may still be running or vice-versa (e.g., depending on the periodicity of the selected CG), which may cause undesired outcomes if the CG timer is not maintained properly when the AUL timer expires.

Figure 2:
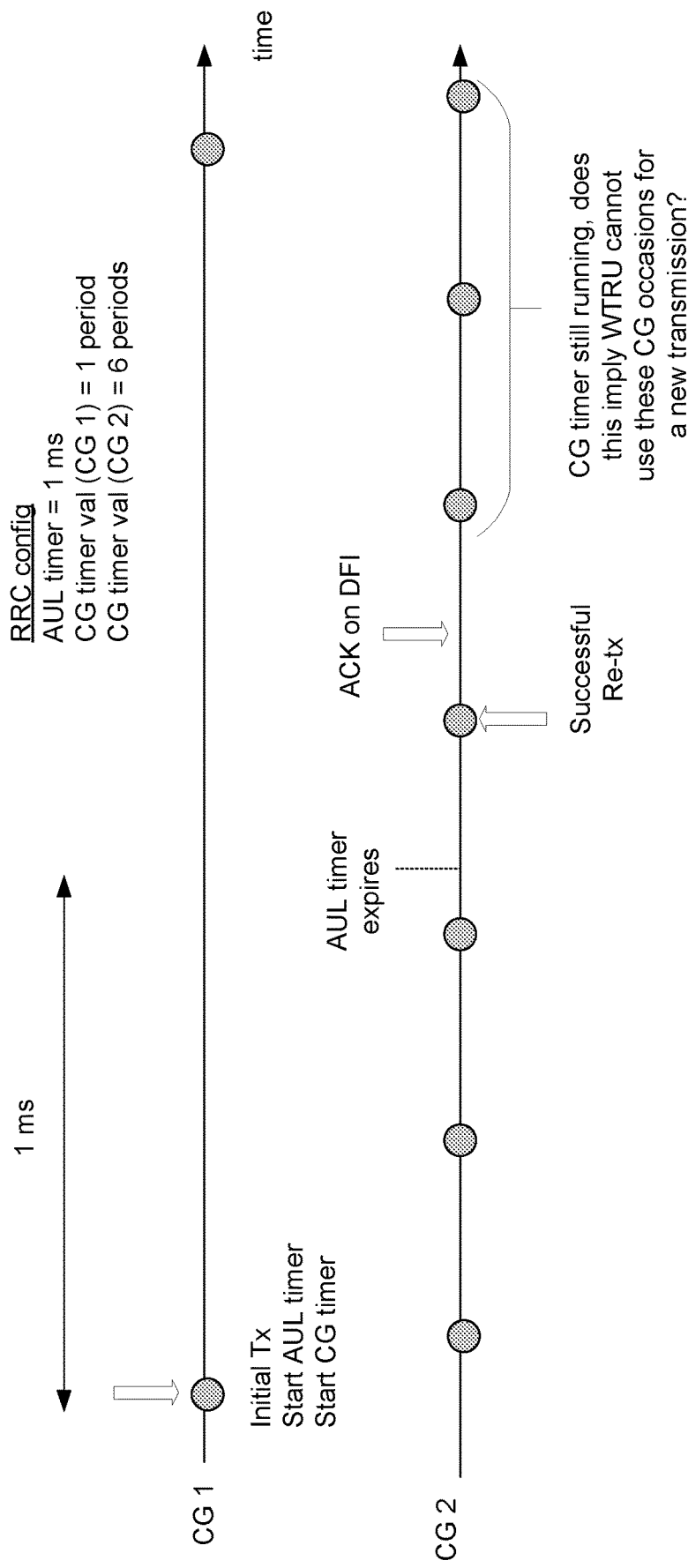
FIG. 2 is a diagram illustrating an example of Configured Grant (CG) retransmission timers upon switching between CGs.

FIG. 2 is a diagram illustrating CG retransmission timers upon switching between CGs. Referring to FIG. 2, a RRC configuration may include an AUL timer set to a first period (e.g., 1 ms), a first CG timer, for example for CG 1, set to 1 period (e.g., one periodicity) and a second CG timer, for example for CG 2, set to 6 periods (e.g., six periodicities). In an example, the WTRU 102 may send an initial transmission on CG 1 and may start the AUL timer and the CG timer. The next CG occasion may occur after the CG timer expires. The WTRU 102 may select CG 2 for a retransmission and may update the CG timer to a different number of elapsed periods (e.g., 2 elapsed periods). The WTRU 102 may send the re-transmission successfully at the next CG occasion. The WTRU 102 may receive and Acknowledgment (ACK) via or on DFI. In this example, the CG timer may continue to run and the WTRU 102 may not use the subsequent CG occasions for new transmissions.

For example, when the AUL timer expires and the WTRU 102 selects a CG occasion of a CG with a different periodicity than that chosen for the previous transmission or retransmission, the WTRU 102 may toggle (e.g., inadvertently toggle) a New Data Indicator (NDI) and may flush the buffer for the HARQ PID on which the TB is pending, if the CG timer is not updated properly according to the selected CG. On the other hand, if the WTRU 102 keeps the CG timer running even though a retransmission was successful (e.g., the ACK was received on the DFI) on a CG with a shorter periodicity, the WTRU 102 may lose on using upcoming CG occasions for a new transmission until the CG timer expires.

In certain representative embodiments, the WTRU 102 may retransmit on any active CG occasion after the AUL timer expires for the HARQ process used to transmit the initial TB.

Figure 3:
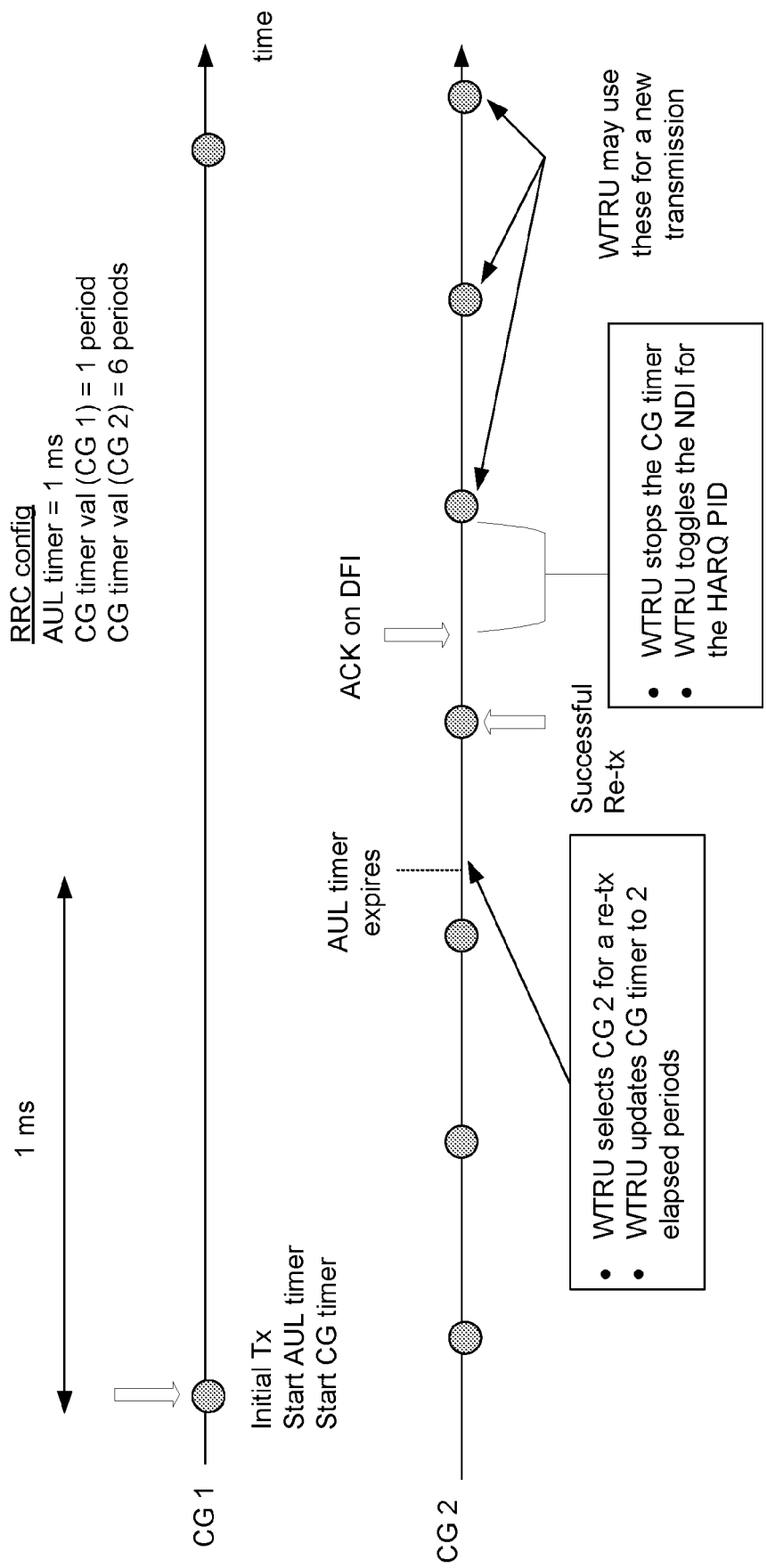
FIG. 3 is a diagram illustrating an example of updating the CG timer based on Downlink Feedback Information (DFI) reception and CG selection.

FIG. 3 is a diagram illustrating representative procedures to update a CG timer based on a DFI reception and/or a CG selection.

Referring to FIG. 3, a RRC configuration may include an AUL timer set to a first period (e.g., 1 ms), a first CG timer, for example for CG 1, set to 1 period (e.g., one periodicity) and a second CG timer, for example for CG 2, set to 6 periods (e.g., six periodicities). In an example, the WTRU 102 may send an initial transmission on CG 1 and may start the AUL timer and the CG timer. The next CG occasion may occur after the CG timer expires. The WTRU 102 may select CG 2 for a retransmission and may update the CG timer to a different number of elapsed periods (e.g., 2 elapsed periods). For example, the WTRU 102 may send the re-transmission successfully at the next CG occasion. The WTRU 102 may receive and Acknowledgment (ACK) via or on DFI. In this example, during the period between the ACK and the following CG occasion, the WTRU 102 may stop the CG timer and may toggle the New Data Indicator (NDI) for the HARQ PID. The WTRU 102 may use the subsequent CG occasions for new transmissions.

In certain representative embodiments, the WTRU 102 may implement at least one of the following (e.g., operations/procedures, methods and/or principles) for transmission or retransmissions on CGs (for example to ensure efficiency of configured CG resources):

(1) upon receiving a HARQ Acknowledgement (ACK) in the DFI for a TB, the WTRU 102 may stop the CG timer for an applicable HARQ PID;

(2) upon receiving the HARQ ACK in the DFI for the TB, the WTRU 102 may toggle the NDI for the applicable HARQ PID or may toggle the NDI at or prior to the next CG occasion occurring after the ACK has been received for the TB on the applicable HARQ PID;

(3) when selecting a HARQ PID for an initial transmission on a CG from the HARQ PID pool configured for AUL/CG transmissions, the WTRU 102 may exclude HARQ PID(s) on which:

(i) a dynamic grant is received, and/or (ii) a transmission of another TB is pending (e.g., as the NDI may not be toggled yet, a HARQ ACK feedback may not have been received yet for the HARQ PID, and/or the HARQ buffer of the identified process may not be empty).

If the AUL timer has expired and the CG timer is running, and the WTRU 102 selects a CG occasion for a retransmission on a different active CG than the one used for the previous one or more transmissions or retransmissions, the WTRU 102 may at least one of:

(1) perform a restart of the AUL timer after a transmission or retransmission on a CG occasion for which LBT was successful;

(2) perform an update of the CG timer value for the applicable HARQ PID according to a periodicity of the selected CG (for example, as shown in FIG. 3, if the WTRU 102 switches to CG 2 to perform a retransmission upon the expiry of the AUL timer, the WTRU 102 may update the CG timer to 2 periods);

(3) not perform a toggle of the NDI until an ACK is received in the DFI for the HARQ PID (for example if the CG timer expires or has expired upon the updating of the value of CG timer according to the periodicity of a newly selected CG and/or an ACK has not been received for the pending TB); and/or (4) perform a conversion of the value configured for the CG timer according to the CG on which the PDU is transmitted or retransmitted (for example, the WTRU 102 may scale the configured value configured for the CG timer by one or more factors (e.g., a period of the select CG and/or a period of the CG for which the timer was started), among others).

Representative Procedures for Handling Conflicts Between or Among CGs and DGs

In NR-U, the WTRU 102 may select (e.g., autonomously select) a HARQ PID from a PID pool configured for a CG transmission. The WTRU 102 may select a PID for which the AUL timer is stopped or not running for the purpose of a retransmission or a new transmission on a CG, though the network may simultaneously issue a DG with the same HARQ PID. The Downlink Control Information (DCI) for scheduling the DG may be received any of: (1) before the AUL transmission; (2) after the WTRU 102 selects a HARQ PID for the CG; and/or (3) after (e.g., shortly after) the transmission has started on the CG. Representative procedures for the WTRU 102 to handle such conflicts may be defined and may be implemented as disclosed herein.

For example, the WTRU 102 may determine a HARQ PID conflict based on any of: (1) the WTRU 102 selecting a HARQ PID for a PDU for transmission or retransmission on a CG and receiving a DG with the same HARQ PID; (2) the WTRU 102 receiving a DG that overlaps in time and/or frequency domains with the CG from a resource perspective; and/or (3) the WTRU 102 receiving a DG with a HARQ PID configured for an AUL/CG transmission.

If the WTRU 102 determines a HARQ PID conflict and the NDI for the DG is toggled, the WTRU 102 may ignore the toggling of the NDI and may keep the PDU in the HARQ buffer for the identified HARQ PID. The WTRU 102 may further consider and/or may determine the Transport Block Size (TBS) of the DG compared to the TBS of the CG and/or whether the Transport Blocks overlap in time and/or frequency. For example, the WTRU 102 may ignore toggling the NDI if TBS(DG)>=TBS(CG) and/or the two grants overlap.

When the WTRU 102 receives a DG with a HARQ PID configured for CG transmission for which the AUL timer is running, and another CG occasion for which the same HARQ PID is applicable occurs before a start of a Physical Uplink Shared Channel (PUSCH) of the DG, the WTRU 102 may prioritize a selection of the DG over the CG for the retransmission (for example, if the NDI was not toggled, e.g., as part of the HARQ information provided for the DG). Representative Procedures for Backoff Prior to Retransmission on CGs When a channel is busy for an extended duration, there may be a higher probability of collision on a CG when the channel becomes available again, given that a large number of WTRUs 102 may transmit (e.g., may need to transmit) pending data, simultaneously. In scenarios of high channel loading/inter-WTRU blocking, the WTRU 102 may perform a back-off prior to selecting the first available CG occasion.

The WTRU 102 may be configured to start a back off timer when: (1) an LBT fails for a CG transmission; (2) after a number of LBTs fail for a CG transmission, and/or (3) once a channel becomes available. The back off may be realized by: (1) starting the AUL timer or the CG timer for the applicable CG or (2) starting another back off timer. For example, the WTRU 102 may condition the start of a timer on the channel load and/or a priority of the data on the channel. For example, the WTRU 102 may start the CG timer and/or the AUL timer once an LBT fails for a PUSCH transmission on a CG occasion, for example when the measured received signal strength indicator (RSSI) or the Channel Occupancy (CO) on the channel on which the CG is configured is above a certain threshold. In another example, the WTRU 102 may start the back off timer, the CG timer, and/or the AUL timer, if the highest priority data included in a PDU is of a priority less than a configured threshold. The WTRU 102 may maintain one or more back off timers per CG resource or per LBT sub-band or per carrier.

Upon expiry of or stopping of a back off timer, the WTRU 102 may transmit or retransmit the PUSCH on a CG occasion. The value of the back off timer may be configured by higher or upper layer signaling. Upon starting the back off timer, the WTRU 102 may apply the configured value to the back off timer, or may start the back off timer with a random value uniformly distributed between 0 and the configured value. In another example, a back off timer adaptation may be used. In such a case, a back off timer value may depend on a previously used back off timer for the CG resource and an additional time value that may be added or removed.

The WTRU 102 may be configured with a back off value per logical channel (LCH), and the WTRU 102 may apply a back off for one or more new transmissions according to a largest back off value configured for the LCHs multiplexed on a PDU.

The WTRU 102 may stop the back off timer (e.g., the CG timer, and/or the AUL timer) after the WTRU 102 receives a trigger signal from the gNB 180, possibly on the same channel as the CG. For example, the WTRU 102 may stop the back off timer upon receiving a Demodulation Reference Signal (DM-RS) or upon receiving a preamble signal from the gNB 180 (for example on the same channel on which the CG is configured). In certain representative embodiments, the WTRU 102 may stop the back off timer after the WTRU 102 receives an indication from the gNB 180, which the WTRU 102 may determine from explicit DCI and/or MAC CE signaling or may determine implicitly from a reception of a DL signal and/or a channel before the CG occasion. The gNB 180 may indicate to the WTRU 102 to start the back off timer of the WTRU 102 via a DL indication (e.g., an implicit indication or explicit indication), such as the Medium Access Control (MAC) Control Element (MAC CE) and/or DCI. The WTRU 102 may receive an indication from the gNB 180 indicating back off for the CG transmissions or retransmissions for a period of time or for a number of upcoming CG occasions. For example, the WTRU 102 may be preconfigured with an initial back off period either in absolute time or in number of CG periods, and the WTRU 102 may start the configured back off period after receiving a back off indication from the gNB 180. The back off indication to the WTRU 102 may be applicable to specific CG or a specific sub-band. For example, the WTRU 102 may start a back off on a particular sub-band and/or CG if the WTRU 102 receives a particular back off indication on the same sub-band, or with the sub-band and/or CG explicitly indicated. In another example, the WTRU 102 may start the back off timer (e.g., the CG timer and/or the AUL timer, among others) if the WTRU 102 does not receive an expected or a periodic DL trigger signal before (or within a period of or after) the start of a CG occasion or of a subset of CG occasions).

Representative Procedures for Redundancy Version (RV) Selection for Transmissions on CGs In legacy FeLAA LTE systems, the WTRU 102 may select a RV (e.g., on its own) and may signal its part of Uplink Control Information (UCI) in an AUL transmission or retransmission. Unlike turbo codes, Low-Density Parity Check (LDPC) codes may contain more systematic bits in the first and last RVs. Random RV selection may not work in NR-U as well as in LTE/FeLAA AUL. If the WTRU 102 keeps incrementing the RV for each transmission attempt regardless of the LBT outcome, the gNB 180 may not benefit from a soft combining perspective if retransmissions are received with the same RV. In certain representative embodiments, the WTRU 102 may select a RV according to a preconfigured behavior or predetermined behavior, for example to improve the outcome for the soft combining operation.

In certain representative embodiments, the WTRU 102 may increment the RV conditionally on LBT succeeding for a previous transmission or retransmission. For example, the WTRU 102 may increment the RV after (e.g., only after) a transmission or retransmission on which LBT was successful on a CG. In other representative embodiments, the WTRU 102 may be configured with a sequence and/or a pattern to select the RV for a transmission or a transmission on the applicable CG. For example, when the WTRU 102 is configured with a RV sequence for repetition on CGs, the WTRU 102 may increment the RV per the configured sequence if LBT succeeds for the transmission of a given repetition.

The WTRU 102 may reset the RV to 1 (or an initial value or a pre-configured value) for a retransmission after the WTRU 102 switches to a different active CG on a different sub-band, a different LBT bandwidth, a different BWP, and/or a different UL carrier.

Representative Procedures for CG Retransmissions on a Different LBT Channels

In certain embodiments, a WTRU 102 may be configured with multiple CG configurations such that each CG may be in a different sub-band and/or a different carrier. In one example embodiment, a WTRU 102 may be configured to autonomously select a CG from a configured set of CGs for initial transmission of a transport block (TB) and use the same CG resource for the subsequent retransmissions/repetitions of the initially transmitted TB. In another example embodiment, for the same TB, a WTRU 102 may be able to or be configured to select or reselect different CG resources in different sub-bands for retransmissions/repetitions based on any of the following triggers:

(1) a number of channel access failures (e.g., LBT failures) is above a threshold (for example the channel access failures may occur while attempting to retransmit/performing repetition of the same transport block using the initially selected CG. In certain representative embodiments, a WTRU 102 may select a CG resource within a sub-band to transmit a TB. The channel access procedure may have succeeded in the first transmission, while during the retransmission/repetition, the WTRU 102 may fail to access the channel N times and N is above a configured threshold. A WTRU 102 may be semi-statically or statically configured with N, or, may be dynamically configured with N. In one example embodiment, a WTRU 102 may be configured with a counter to count the number of failed channel accesses. The WTRU 102 may reset the counter after succeeding in accessing the channel. In certain representative embodiments, the WTRU 102 may keep running the counter after succeeding in accessing the channel and may reselect a different CG upon the counter reaching N);

(2) the number of channel access failures (i.e. LBT failures) within a sub-band is above a configured threshold (for example, a WTRU 102 may be semi-statically, statically or dynamically configured with a maximum number of attempts. In one example embodiment, a WTRU 102 may be configured with a counter to count the number of failed channel accesses within a sub-band. The WTRU 102 may reset the counter after succeeding in accessing the channel. In certain representative embodiments, the WTRU 102 may keep running the counter after succeeding in accessing the channel and may select or reselect different CG upon the counter reaching a maximum number. In some embodiments, a WTRU 102 may consider (e.g., only consider) the number of channel access failures that occurred while attempting to transmit some UL signals within the sub-band. For example, a WTRU 102 may consider any of Physical Uplink Control Channel (PUCCH), Physical Random Access Channel (PRACH) and/or PUSCH carrying UCI signals (e.g., only PUCCH, PRACH and/or PUSCH carrying UCI signals). In some embodiments, a WTRU 102 may consider the number of channel access failures that occurred while attempting all the UL signals within the sub-band);

(3) detection of a systematic/persistent/consistent LBT failure in the MAC layer (for example, the WTRU MAC may detect in a representative procedure a consistent LBT failure and the WTRU 102 may select and/or switch to another active: (1) sub-band, (2) BWP, and/or (3) carrier to perform the next transmission or retransmission);

(4) a time elapsed is above a configured threshold or a predetermined threshold (e.g., from a first time a WTRU 102 attempts to access the channel for an initial transmission);

(5) a time elapsed is above a configured threshold or a predetermined threshold (e.g., from the first-time a WTRU 102 attempts to access the channel for retransmission);

(6) a measured RSSI or a CO per sub-band is above a configured threshold or a predetermined threshold (for example, a WTRU 102 may be configured to measure the RSSI per sub-band and/or a WTRU 102 may be configured to measure the RSSI per sub-band prior to starting channel access procedure on that sub-band. The WTRU 102 may determine that the measured RSSI on the sub-band on which the last transmission or retransmission was attempted is above a configured threshold and may select a different sub-band. In certain embodiments, the WTRU 102 may select a different active sub-band, BWP, and/or carrier to perform the next transmission or retransmission if the measured RSSI on that sub-band, BWP, and/or carrier is less than a configured threshold);

(7) a CG periodicity used for initial transmission of the TB is above a configured threshold or a predetermined threshold (for example, a WTRU 102 may be configured with two CG configurations, a first configuration with a first periodicity (e.g., relatively larger periodicity, for example at or above a first threshold) and a second configuration with second periodicity (e.g., relatively smaller periodicity, for example below the first threshold). At the time of the first transmission, the first configuration (e.g., only the first CG configuration) may be available, and the second CG configuration may not available until the next opportunity (e.g., next period, next time frame and/or next slot). The WTRU 102 may select the first configuration and may reselect the second configuration for retransmission in the next slot);

(8) Large number (e.g., above a configured threshold or predetermined threshold) of missing HARQ-ACK feedback and/or a large number of NACKs are received for one or more previous transmissions or one or more previous retransmissions within a configured time window (for example, a WTRU 102 may select a CG resource within a sub-band and may transmit TBs and their one or more retransmissions. The WTRU 102 may start a timer to count the number of NACKs and/or missing HARQ-ACK feedbacks for the configured time window. After timer expiry, the WTRU 102 may determine that the number of missing HARQ-ACK feedbacks and/or number of NACKs is above a configured or predetermined threshold and the WTRU 102 may, for example, select or reselect different CG in different sub-band); and/or (9) based on Logical Channel Prioritization (LCP) parameters (for example, the WTRU 102 may select a different active CG to perform the next transmission or retransmission, for example if data included in a PDU can be mapped to a grant and/or the grant meets the LCP mapping restrictions configured for LCHs included in the PDU, among others.

Representative Procedures for CAPC Selection for Transmissions on CGs

In FeLAA, the WTRU 102 may select the lowest channel access priority class among those configured for the LCHs in the PDU. Applying the same rule for NR-U may force the WTRU 102 to group data of the same priority (or CAPC) in the same PDUs.

In certain embodiments, the WTRU 102 may exclude certain LCHs in LCP during PDU construction, if any of the following is satisfied:

(1) priority (LCH) s threshold, and/or higher priority LCHs map to grant, (in one example, the priority threshold may be indicated per grant and/or may be determined by the WTRU 102 from a scheduling resource or a physical characteristic of the grant itself);

(2) CAPC priority (LCH) s threshold, and other LCHs of higher priority CAPC configured map to grant (in one example, the WTRU 102 may determine the threshold based on whether the PDU includes a MAC CE and/or a subset of high priority MAC CEs. The RRC may configure a mapping between a subset of MAC CEs and a CAPC.

(3) Radio Resource Control (RRC) configures a subset of LCHs for: (1) possible exclusion (e.g., even if the subset of LCHs meet LCP restriction) and/or (2) multiplexing with LCHs of similar or higher CAPC priority, (for example, the RRC may configure all or a subset of LCHs carrying SRBs to be multiplexed with LCHs of the same CAPC or higher priority CAPCs. In the LCP procedure, the WTRU 102 may multiplex (e.g., may only multiplex) the LCHs configured with a CAPC priority that is >=the CAPC priority configured for the LCHs carrying SRBs included in the PDU, and may exclude other LCHs configured with lower CAPC priorities. In another example, when and/or if the PDU includes LCH carrying SRBs, the WTRU 102 may include (e.g., only include) LCHs configured with the same or higher LCP priorities.

(4) number of LBT fails threshold, for example as configured by RRC;

(5) number (or %) of bits of excluded LCHs that "would map" to grant s threshold;

(6) ratio of bits of excluded LCHs that "would map" to grant/{TBS, or bits mapping to grant from non-excluded LCHs} s threshold;

(7) number (or %) of bits of non-excluded LCHs that "would map" to grant threshold; and/or (8) ratio of bits of non-excluded LCHs that map to grant/{TBS, or bits mapping to grant from excluded LCHs} threshold, among others.

In other representative embodiments, the WTRU 102 may dynamically determine the CAPC and/or exclude data transmission from certain LCHs based on any of the following:

(1) a timer expiring and/or a time elapsed since an initial transmission was made is larger than a configured or predetermined threshold (for example, the WTRU 102 may increment the CAPC priority if the time elapsed since the PDU construction or an initial transmission is larger than a configured threshold);

(2) a priority of a highest priority LCH in the MAC PDU does not satisfy a threshold requirement (for example, the WTRU 102 may apply the highest priority CAPC (or the lowest CAPC number configured), if data in the PDU has an LCP priority less than a certain configured or predetermined priority and/or the number data bits is less than a configured or predetermined threshold);

(3) a number of padding bits and/or a TBS is greater than or equal to a configured or predetermined threshold (for example, the WTRU 102 may apply a lower priority CAPC, if the number of data bits is less than a configured threshold and/or the WTRU 102 may apply UL skipping on the CG occasion, if the number of data bits is lower than or equal to a configured threshold, or if the number of padding bits is greater than or equal to a configured threshold);

(4) a transmission and/or retransmission number exceeds a configured or predetermined threshold (for example, the WTRU 102 may change the CAP used based the retransmission attempt number or the number of LBT failures); and/or (5) reception of a muting indication or change of LBT configuration, for example from the gNB 180 (for example, the gNB 180 may determine that some WTRUs 102 or LCHs are unfairly increasing the load and/or CO. The WTRU 102 may receive a muting indication (or a change of LBT configuration) for UL transmissions (e.g., some or all UL transmissions), a subset of transmissions, a subset of UL channels, a subset LCHs, and/or a subset of UL resources. The muting indication or change of LBT configuration indication may be in effect until: (i) otherwise indicated, (ii) scheduled by a dynamic grant, and/or (iii) until a period has elapsed (which can be configured by RRC or indicated dynamically), among others.

Representative Procedures for Transmit Power Allocation and Power Control

A WTRU 102 may be configured with multiple unlicensed carriers. The WTRU 102 may have CG resources on a plurality of those carriers. In some instances, the WTRU 102 may have transmissions on multiple unlicensed carriers. For example, the WTRU 102 may transmit multiple PUSCHs, for example simultaneously on multiple CG resources in different carriers or the WTRU 102 may transmit, for example simultaneously at least one PUSCH on a CG in one unlicensed carrier and at least one PUSCH on a DG in one (e.g. one other) unlicensed carrier.

When simultaneously transmitting on multiple carriers, the WTRU 102 may determine the transmission power in each carrier as a function of at least a total number of simultaneous UL transmissions.

In certain embodiments, the total power available to be used by a WTRU 102 for the simultaneous UL transmissions (e.g., all of the simultaneous UL transmissions) may be fixed (e.g., to a maximum value (e.g., Pcmax)). Since interference may not be as big a factor in unlicensed operation, it is contemplated that the transmission power of each PUSCH may be maximized. In such embodiments, the WTRU 102 may allocate the power for each PUSCH, for example to achieve a maximum total power. For example, the WTRU 102 may determine the power of each PUSCH based on allocation rules described herein. In some cases, a PUSCH transmission power may have a limit (e.g., to achieve regulatory requirements). For example, the WTRU 102 may assign or reassign any unused power to other PUSCH transmissions, to other carriers and/or to LBT sub-bands.

In a procedure in which the WTRU 102 may have a maximum total transmission power that may be shared by all the simultaneous transmissions, the WTRU 102 may determine the amount of power to allocate to each PUSCH transmission based on any of:

(1) equal sharing of power (for example, the WTRU 102 may divide the total maximum transmission power for PUSCH transmissions (e.g., equally for all the PUSCH transmissions);

(2) weighted sharing of power (for example, each PUSCH may use a weighted share of the power. The maximum transmission power may be shared among the PUSCH transmissions (e.g., all of the PUSCH transmissions) and the ratio for the weighted shares used by a PUSCH may depend on any of:
  (i) a type of grant (e.g., a DG or a CG) such that for example a CG may use a larger share of the transmission power (possibly to ensure robustness on shared CG resources).
  (ii) one or more parameters of the grant, for example, a frequency allocation (including a number of LBT sub-bands that the allocation spans), a Modulation Coding Scheme (MCS), a TBS, a Subcarrier Spacing (SCS), and the like.
  (iii) an LBT type or parameters used for the carrier such that for example the WTRU 102 may determine a weighted share of the power allocation for a PUSCH depending on the LBT type or parameters used to access the carrier of the transmission (for example, depending on a parameter of the LBT (e.g., an Energy Detection (ED) threshold, a Contention Window Size (CWS), a CAPC and the like) or the LBT type (e.g., a CAT2 or a CAT4), the WTRU 102 may use different weights. For example, the WTRU 102 may use a higher power for carriers using LBT with higher (or lower) priority access priority);
  (iv) a LCH being mapped to the grant (for example, based on the LCH priority of the LCH, the WTRU 102 may determine an appropriate power allocation weight);
  (v) an CO measurement (for example, based on the CO or an RSSI measurement, the WTRU 102 may adapt the power allocation weight of a transmission);
  (vi) an interlacing used for a transmission (for example, the interlacing parameters (e.g. a number of PRBs used for transmission and/or a number PRBs unused) or a number of interlaces used, may determine a weight of the power allocation sharing of a transmission;
  (vii) whether the transmission is an original transmission or a retransmission, among others; and/or
  (viii) whether a previous transmission attempt for the transport block failed due to LBT failure.

A WTRU 102 may acquire (e.g., successfully acquire) a subset of carriers for which the WTRU 102 has a DG or the WTRU 102 is intending to use a CG resource at any given moment. In such a case, the WTRU 102 is not expected to or does not perform an UL transmission for a carrier which has had an LBT failure. The WTRU 102 may be able to reallocate part of or all of the power that was calculated for a transmission on the carrier where LBT failed, to at least one other transmission on one or more carriers where the LBT succeeded. For example, a WTRU 102 may have two simultaneous transmissions occurring on two CGs in two different carriers. LBT may succeed on a first carrier and may fail on a second carrier. In such a case, the power allocated for the transmission in the second carrier may be reallocated to the transmission in the first carrier.

The WTRU 102 may predetermine multiple power allocation values for each PUSCH based on different LBT acquisition outcomes, for example to facilitate WTRU processing. For example, a WTRU 102 with two transmissions may predetermine three transmission states, each with different power allocation values for the two transmissions (for example (P1a,P2a) if both LBTs succeed, (P1b,0) if only the LBT for the first transmission succeeds and (0,P2b) if only the LBT for the second transmission succeeds). The WTRU 102 may calculate n values for each PUSCH transmissions if the WTRU 102 has n simultaneous transmissions scheduled, for example to reduce the total number of pre-allocation values to be calculated considering all possible LBT outcome combinations. Depending on the number of successful LBTs, the WTRU 102 may select one of the calculated n values.

The gNB 180 may indicate to the WTRU 102 that the gNB 180 is sharing the COT (e.g., acquired before the start of the PUSCH for a CG resource (or any UL resource)). For example, the gNB 180 may indicate to the WTRU 102 that the gNB 180 is sharing the COT along with a remaining time before the maximum COT (MCOT) is reached. The WTRU 102 may determine the COT sharing implicitly and/or explicitly.

The WTRU 102 may determine the COT sharing (e.g., a DL to UL switch) based on explicit signaling from the gNB 180. For example, the WTRU 102 may receive information via any of: (1) a MAC CE; (2) a DCI; (3) a Physical Downlink Shared Channel (PDSCH); and/or (4) a broadcasted transmission indicating a remaining time in the MCOT along with possibly LBT configuration parameters, and/or an applicable active CG configuration (or a UL resource). The WTRU 102 may determine the COT sharing (a DL to UL switch) after receiving an indication in the DCI, a property of the DCI, or a property of a Physical Downlink Control Channel (PDCCH) resource.

In certain representative embodiments, the WTRU 102 may determine the COT sharing (e.g., a DL to UL switch) based on an implicit indication from the gNB 180. For example, the WTRU 102 may receive a channel acquisition signal (or trigger) at an end of the DL transmission, such as a DM-RS or a preamble, for example to indicate, to the WTRU 102, an end of a DL portion of an acquired COT and possibly an implicit LBT configuration parameters that can be deduced for the UL. In another example, the WTRU 102 may determine that a COT is shared based on receiving a DL data transmission that ends within a certain time gap from a start of the PUSCH on the first CG occasion. For example, the WTRU 102 may be configured with a DL SPS resource that may end within a short time gap from the start of PUSCH of the first CG occasion such that the short time gap can allow (e.g., is acceptable to allow) COT sharing between the gNB 180 and the WTRU 102. The WTRU 102 may implicitly determine the remaining time in the COT based on the start of the first PDSCH received on the DL SPS resource.

In certain representative embodiments, the WTRU 102 may indicate to the gNB 180 that the gNB 180 is sharing the COT it has acquired for the purpose of transmitting on a CG. The WTRU 102 may signal to the gNB 180 that it has no more data to transmit for the remaining COT. For example, the WTRU 102 may indicate to the gNB COT sharing along with the remaining time before the MCOT is reached. Such an indication may be indicated implicitly or explicitly. For example, the WTRU 102 may include a MAC CE indicating the remaining time in the MCOT.

Aperiodic UL or DL CGs can be useful in licensed and/or unlicensed spectrum. In unlicensed spectrum, the time the channel becomes available may be unaligned with the next CG occasion, thus yielding the channel to other technologies. By the time the CG occasion starts, the channel may no longer be available. When the WTRU 102 transmitting or receiving Time-sensitive communications (TSC) traffic, traffic pattern periodicity may not be aligned with a periodicity of SPS and/or CG resources. For example, TSC message periodicities with non-integer multiple of NR supported CG/SPS periodicities may cause undesired: (1) delays for a subset of latency-critical messages and/or (2) additional buffering (for example for jittered messages that do not align with upcoming CG occasions).

In certain embodiments, the WTRU 102 may receive DL signaling or an indication that indicates that the next one or more CG occasions is shifted by a period of time, a number of symbols, and/or a number of slots. The WTRU 102 may receive the DL signaling or the indication via a DCI, in a DCI field, in a MAC CE, and/or may determine the indication from a PDCCH property. The WTRU 102 may be preconfigured with one or more conditional time shifts, from which the WTRU 102 may select according to an indicated shift or a shift index. For example, the WTRU 102 may be preconfigured by the RRC or a higher layer with a number of time shifts and the WTRU 102 may shift an upcoming CG occasion by the applicable shift indicated by the gNB 180. The WTRU 102 may attempt to transmit on a shifted UL CG occasion and/or may attempt to receive DL data on a shifted DL CG occasion. The WTRU 102 may be configured or indicated to apply a shift for a number of upcoming CG occasions, a period of time, and/or once every Nth CG occasion, whereby N can be signaled or preconfigured.

In certain embodiments, the WTRU 102 may be configured or specified to conditionally consider a subset of CG occasions, CG configurations, and/or CG resources based on an LBT outcome or based on a delay (e.g., a jittering delay) to the next one or more CG occasions.

The WTRU 102 may be configured or specified to consider a set of CG occasions and/or CG configurations as one or more conditional CG occasions to be applicable for certain conditions. For example, the WTRU 102 may skip monitoring the next N CG occasions and/or may skip the additional/conditional set of CG occasions, if the WTRU 102 receives a DL signal prior to some CGs and is not scheduled to receive any DL TBs in a non-conditional CG occasion. The value of N can be configured by higher layers and is at least 1. In another example, the WTRU 102 may monitor the N upcoming CG occasions or the set of conditional/additional CG occasions, if the WRTU receives a DL signal, a trigger signal, or a DRS signal prior to or during the non-conditional CG occasion.

In an embodiment, the WTRU 102 may consider another conditional CG as active if it has not received a DL scheduling, a discovery reference signal (DRS) (e.g. a synchronization signal), a wake-up signaling, a channel acquisition signal, or/and a trigger DL signal prior to a start of a given CG resource or a conditional CG occasion.

In certain representative embodiments, the WTRU 102 may consider (or determine that) another CG is active, if the jittering delay between the TSC message arrival time and an upcoming CG occasion of the active CG configuration(s) is great than or equal to a time threshold. The time threshold may be preconfigured and/or predetermined based on the period of the applicable CG configuration. The WTRU 102 may determine the TSC arrival time: (1) based on the TSN traffic pattern provided by the core network (e.g., a network entity); (2) determined within the WTRU 102, and/or (3) according to the arrival instant at the WTRU buffer. The WTRU 102 may be configured with a pattern to switch to another active CG once every Nth CG occasion, for M≥1 CG occasions, then the WTRU 102 may switch back to the original CG occasion, whereby the values of N and M may be configured by the RRC.

In certain representative embodiments, when the WTRU 102 is configured with a Discontinuous Reception (DRX), the DRX is active and the CG is configured such that a subset of the CG occasions does not overlap with On Durations, the WTRU 102 may autonomously wake up to transmit on CG occasions not aligned with the On Duration. The WTRU 102 may condition such behavior on any of:

(1) the delay between the message arrival time and the next On Duration,
(2) the duration since the PDU had been constructed, and/or
(3) the number of LBT failures and/or retransmissions for the MAC PDU.

The WTRU 102 may start or restart a DRX inactivity timer and a DRX-HARQ-RTT-TimerUL when UL data is transmitted, even if the CG occasion is not aligned with the On Duration.

Depending on channel sparsity and/or traffic arrival pattern, a dynamic indication of additional CG occasions may be beneficial. In certain representative embodiments, the WTRU 102 may receive dynamic signaling and/or indication that may indicate one or more additional/conditional CG occasions, or the removal of one or more CG occasions, which may be potentially valid for a period of time or a number of periods. For example, the WTRU 102 may receive signaling on the DCI or via a MAC CE that may indicate one or more additional or conditional CG occasions. The WTRU 102 may be preconfigured with (or a dynamic indication of) a resource configuration of such additional CG occasions and/or the duration for which such additional occasions are considered valid. For example, the RRC may configure a given CG configuration with a regular period of 2 slots, and may configure an additional/conditional CG occasion offset by {x, y, or z} symbols.

The WTRU 102 may indicate a scheduling assistance information part of a MAC PDU for UL traffic. For example, the WTRU 102 may report any of: (1) a time difference between message arrival time and a CG occasion, (2) a preferred CG configuration, (3) a preferred sub-band and/or BWP, (4) one or more channel measurements, (5) traffic periodicity, (6) a time difference between the message arrival time and a core-network configured traffic arrival pattern, and/or (7) a need for an additional conditional SPS occasion before the next CG occasion of the one or more active CGs.

In certain embodiments, the WTRU 102 may increase or decrease a periodicity of a CG by a preconfigure or indicated factor upon reception of a dynamic indication from the gNB 180. For example, the WTRU 102 may receive a DL MAC CE indicating a scaling of the periodicity of a given CG by a factor of 2, possibly for a period of time that is preconfigured or indicated in part of the MAC CE. The WTRU 102 may consider and/or set additional CG occasion, as a result of such scaling as conditional or additional occasions, as described herein.

Representative Procedures for UCI on a CG Transmission

For a CG transmission, the WTRU 102 may include CG-UCI. The CG-UCI may enable a gNB and/or Access Point, for example to properly decode the CG. For example, the CG-UCI may include any of: (1) a WTRU-ID; (2) a Transport Block Size (TBS); (3) a resource allocation (for example, a CG may be configured with one or more sets of possible resources, and the CG-UCI may indicate what resources, what set of resources or what sets of resources are used (e.g., actually used). In certain examples, a CG may enable transmission on multiple interlaces and the CG-UCI may indicate the one or more interlaces used by the WTRU 102); (4) a Modulation and Coding Scheme (MCS); (5) a number of antenna ports; (6) a pre-coding matrix; (7) a type of LBT used to acquire the channel, which may indicate the LBT category and/or the CAPC used; (8) a Transmission Configuration Indication (TCI) state, which may include a Quasi-colocation assumption; (9) one or more beam used for the transmission, which may include analog and/or digital (e.g. Transmitted Precoding Matrix Indicator (TPMI)) beam information; (10) priority of the transmission, which may include reliability and/or latency requirements; and/or (11) CBG related information, among others.

The UCI may be mapped onto resources of the CG. The network may need and/or require the CG-UCI prior to demodulation of the CG data. In certain representative embodiments, the CG-UCI may be mapped to resources early in the CG slot than the resources of the CG. In certain examples, the CG-UCI may be mapped to the first symbol, or a set of first or early slot symbols, for example with no DM-RS. In other examples, the CG-UCI location within the CG slot may be located at any fixed location or configurable location within the CG slot.

In certain examples, the CG-UCI may be mapped to resources (e.g., symbols) closest to a DM-RS. In certain examples, the CG-UCI may be repeated in different resources of a CG, which may improve CG-UCI robustness.

In certain examples, the CG-UCI may be mapped to a fixed Physical Resource Block (PRB), or a set of PRBs, for example within a interface (e.g., each interlace).

Representative Procedures for Multiplexing CG-UCI, UCI and Data

The WTRU 102 may have a fixed number of resources for CG-UGI (e.g., set aside for CG-UCI). The number of resources may depend on the encoding of the CG-UCI. In some examples, the number of resources for CG-UCI may also be fixed and the encoding of CG-UCI may be fixed, for example to provide robustness (e.g., more robustness).

The resources available for data in a CG resource may depend on a total number of resources acquired and the, possibly fixed, number of resources used for CG-UCI.

The WTRU 102 may be configured with a beta offset value for the data in a CG resource. The beta offset, for example may ensure that a minimum amount of resources may be reserved for CG-UCI. The WTRU 102 may determine the TBS of the data to be transmitted in the CG resource, as a function of any of: (1) a beta offset for the data (for example the beta offset value may be: (i) semi-statically configured, (ii) selected (e.g. from a set of possible values) by the WTRU 102 and/or (iii) included in the CG-UCI; (2) a size of the CG-UCI; (3) duration of the CG resource, and may be a function of the timing of an channel acquisition); (4) resource allocation (for example, the number of interlaces used); (5) a beta offset for the CG-UCI; and/or (6) an MCS selected, among others.

In certain examples, the CG-UCI may not be required in all CG resources. For example, a CG-UCI may be applicable to multiple CG transmissions. Depending on whether or not the WTRU 102 transmits CG-UCI, the WTRU 102 may rate match and/or puncture the data around the CG-UCI in a CG resource.

In certain examples, the WTRU 102 may multiplex the UCI in a CG resource. The UCI may include SR, HARQ and/or CSI feedback. When multiplexing the UCI with the CG, the WTRU 102 may reuse Rel. 15 multiplexing of UCI and data for the resources not used for the CG-UCI.

In some examples, the WTRU 102 may first determine the amount of resources reserved for the CG-UCI. The WTRU 102 may determine the remaining resources to be used for data and/or for regular UCI. The WTRU 102 may compute an amount of resources for the UCI using the beta offset values for the SR, the HARQ and/or the CSI.

In certain examples, the WTRU 102 may multiplex the CG-UCI with the regular UCI, may map the combined UCI to resources of a slot, and may determine leftover resources to be used for data transmission. The CG-UCI may be considered highest priority of all UCI and the CG-UCI may not be dropped from a CG transmission.

In some examples, the CG-UCI may be concatenated to one or a plurality of types of UCI. For example, the CG-UCI may be concatenated to a HARQ UCI. The WTRU 102 may determine the resources for CG-UCI+HARQ UCI using a beta offset value applicable to the concatenated UCI.

Figure 4:
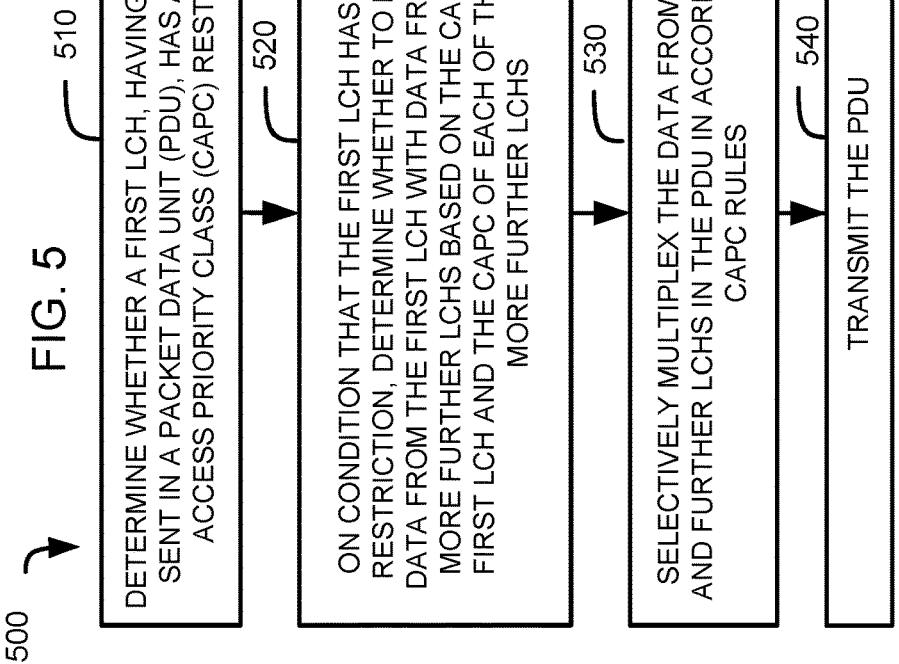
FIG. 4 is a flowchart illustrating a representative procedure for transmission of a transport block.

FIG. 4 is a flowchart illustrating a representative procedure for transmission of a transport block.

Referring to FIG. 4, the representative procedure 400 may include, at block 410, a WTRU 102 receiving LCH information for at least first and second LCHs. The LCH information may, for example include a logical channel priority (LCP) and/or a channel access priority class (CAPC) for some or each of the at least first and second LCHs. At block 420, the WTRU 102 may determine to transmit a transport block (TB) including a packet data unit (PDU). At block 430, the WTRU 102 may determine to include data from a first LCH in the PDU based on the LCP of the first LCH. At block 440, the WTRU 102 may generate the PDU. For example, the PDU may include: (1) the data from the first LCH; or (2) the data from the first LCH and the data from the second LCH. The selection of the contents of the PDU may be based on a comparison of a CAPC of the second LCH to: (i) a threshold; or (ii) the CAPC of the first LCH. At block 450, the WTRU 102 may transmit the TB including the generated PDU.

In certain representative embodiments, the WTRU 102 may determine whether to include the data from the second LCH in the PDU based on whether the CAPC of the second LCH is equal to or exceeds the CAPC of the first LCH.

In certain representative embodiments, the first LCH may have a CAPC restriction and the generation and/or the selection of the contents of the PDU may be further based on the LCH restriction.

In certain representative embodiments, the threshold (e.g., a CAPC threshold) may be any of: (1) a signaled threshold; or (2) a pre-established threshold.

In certain representative embodiments, the first LCH may have a CAPC restriction on condition that the first LCH is carrying priority data/signaling (e.g., URLLC information/signaling and/or a Signaling Radio Bearer (SBR), among others).

In certain representative embodiments, the generated PDU may include the data from the second LCH on condition that the CAPC of the second LCH is greater than or equal to the CAPC of the first LCH.

In certain representative embodiments, the generated PDU may not include the data from the second LCH on condition that the CAPC of the second LCH is less than the CAPC of the first LCH (e.g., the PDU may only include data corresponding to a CAPC above that of the first LCH).

Figure 5:
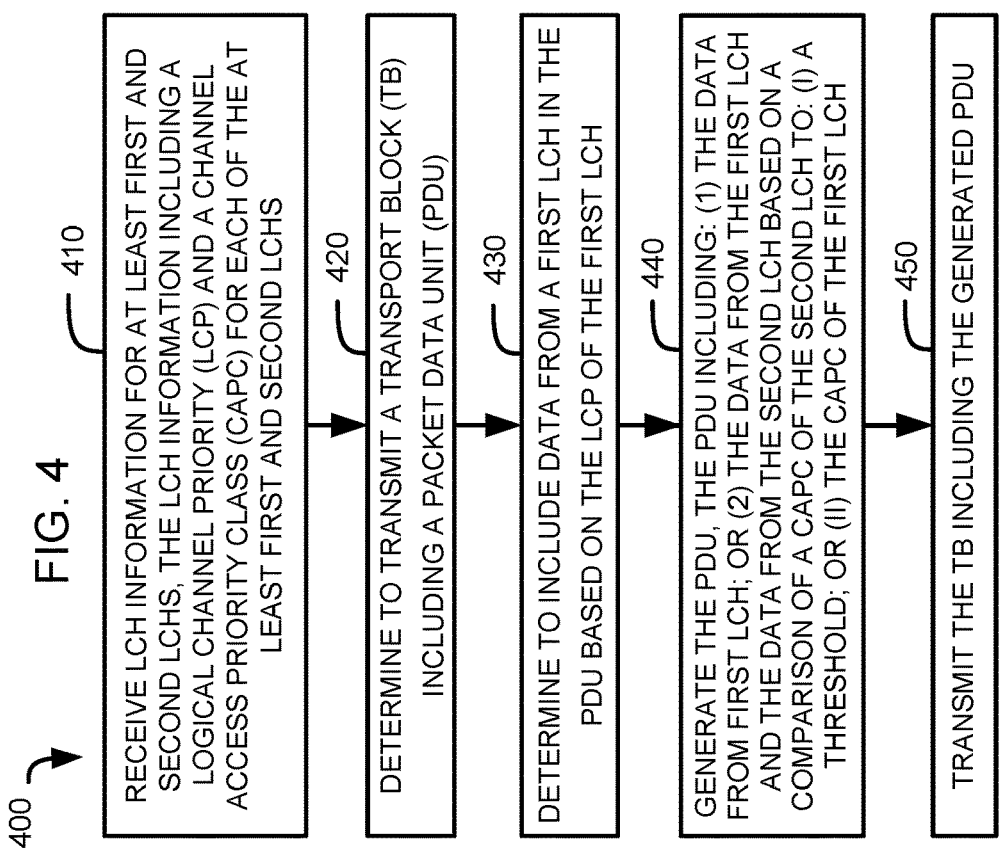
FIG. 5 is a flowchart illustrating another representative procedure for transmission of a PDU.

FIG. 5 is a flowchart illustrating another representative procedure for transmission of a PDU.

Referring to FIG. 5, the representative procedure 500 may include, at block 510, a WTRU 102 determining whether a first LCH, having data to be sent in a packet data unit (PDU), has a channel access priority class (CAPC) restriction. At block 520, the WTRU 102, on condition that the first LCH has the CAPC restriction, may determine whether to multiplex data from the first LCH with data from one or more further LCHs based on the CAPC of the first LCH and the CAPC of some or each of the one or more further LCHs. At block 530, the WTRU 102 may selectively multiplex the data from the first and further LCHs in the PDU in accordance with CAPC rules. At block 540, the WTRU 102 may transmit the PDU.

In certain representative embodiments, the WTRU 102 may receive LCH information for a plurality of LCHs. For example, the LCH information may include a logical channel priority (LCP) and/or the channel access priority class (CAPC) for some or each of the plurality of LCHs.

In certain representative embodiments, the CAPC rules may include any of: (1) a comparison of a CAPC of a second LCH of the one or more further LCHs to a CAPC threshold; (2) a comparison of the CAPC of the second LCH to the CAPC of the first LCH; and/or (3) a comparison of whether the CAPC of the second LCH is equal to or exceeds the CAPC of the first LCH.

In certain representative embodiments, the CAPC threshold may be any of: (1) a signaled threshold; or (2) a pre-established threshold.

In certain representative embodiments, the first LCH may have a CAPC restriction on condition that the first LCH is carrying priority data/signaling (e.g., URLLC data/signaling and/or a Signaling Radio Bearer (SBR), among others).

In certain representative embodiments, the WTRU 102 may selective multiplex the data from the first and further LCHs such that the data from the second LCH is multiplexed in the PDU on condition that the CAPC of the second LCH is greater than or equal to the CAPC of the first LCH.

In certain representative embodiments, the WTRU 102 may selective multiplex the data from the first and further LCHs such that the data from the second LCH is not multiplexed in the PDU on condition that the CAPC of the second LCH is less than the CAPC of the first LCH (e.g., only data corresponding to a CAPC at or above the CAPC corresponding to the first LCH is multiplexed into the PDU).

FIG. 6 is a flowchart illustrating a further representative procedure for transmission of a transport block.

Referring to FIG. 6, the representative procedure 600 may include, at block 610, a WTRU 102 receiving information associated with one or more configured grants (CGs). At block 620, the WTRU 102 may select a first CG corresponding to a first CG configuration. At block 630, the WTRU 102 may transmit, on a CG occasion associated with the first CG, a transport block (TB) using resources associated with the first CG. At block 640, the WTRU 102 may start a CG timer for the first CG responsive to a transmission of the TB. At block 650, the WTRU 102 may receive a HARQ Acknowledgement (ACK) indication indicating a HARQ-ACK feedback value and associated with a HARQ Process ID (PID) in Downlink Feedback Information (DFI) of Downlink Control Information (DCI). At block 660, the WTRU 102 may, after reception of the HARQ ACK indication and on condition that a HARQ-ACK feedback value is equal to ACK: (1) stop the CG timer, and/or (2) flush a HARQ buffer associated with the HARQ PID and/or (3) toggle the NDI for the corresponding HARQ process.

In certain representative embodiments, after expiry of the CG timer: the WTRU 102 may select another CG occasion corresponding to the first CG configuration or another CG configuration and may retransmit, on the selected CG occasion, the TB using resources associated with the selected CG.

In certain representative embodiments, the WTRU 102 may adjust the value of the CG timer and/or a CG retransmission timer based on parameters of the selected CG configuration.

FIG. 7 is a flowchart illustrating a representative procedure for COT sharing.

Referring to FIG. 7, the representative procedure 700 may include, at block 710, a WTRU 102 acquiring a Channel Occupancy Time (COT) associated with a configured grant (CG). At block 720, the WTRU 102 may determine a time remaining of the COT. At block 730, the WTRU 102 may send to a network entity using the CG during the COT, information indicating that the WTRU is sharing the COT with the network entity and the time remaining of the shared COT. At block 740, the WTRU 102 may send a message including any of data or control signaling.

In certain representative embodiments, the WTRU 102 may receive via the network entity, another message during the time remaining of the shared COT in accordance with the information sent by the WTRU 102.

Figure 8:
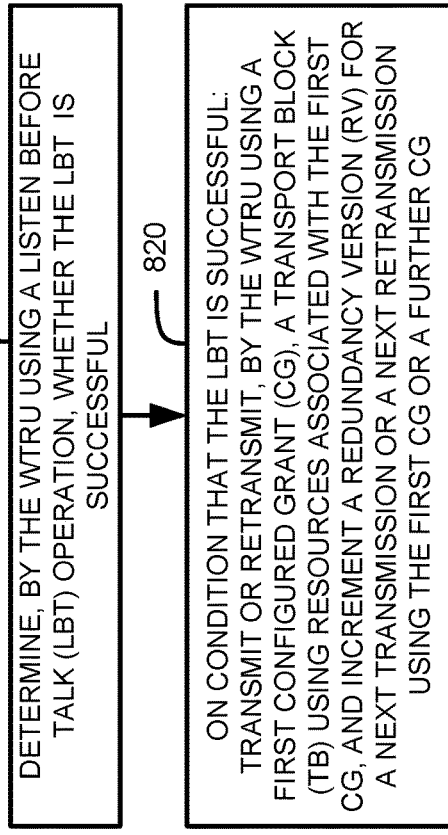
FIG. 8 is a flowchart illustrating an additional representative procedure for transmission of a transport block.

FIG. 8 is a flowchart illustrating an additional representative procedure for transmission of a transport block.

Referring to FIG. 8, the representative procedure 800 may include, at block 810, a WTRU 102 determining, using a Listen Before Talk (LBT) operation, whether the LBT is successful. At block 820, on condition that the LBT is successful, the WTRU 102 may (1) transmit or may retransmit, using a first configured grant (CG), a transport block (TB) using resources associated with the first CG; and/or (2) increment a Redundancy Version (RV) for a next transmission or a next retransmission using the first CG or a further CG. At block 830, on condition that the LBT is not successful, the WTRU 102 may: (1) skip the transmission or the retransmission of the TB; and/or (2) maintain the RV for the next transmission or the next retransmission that uses the first CG or the further CG.

Figure 9:
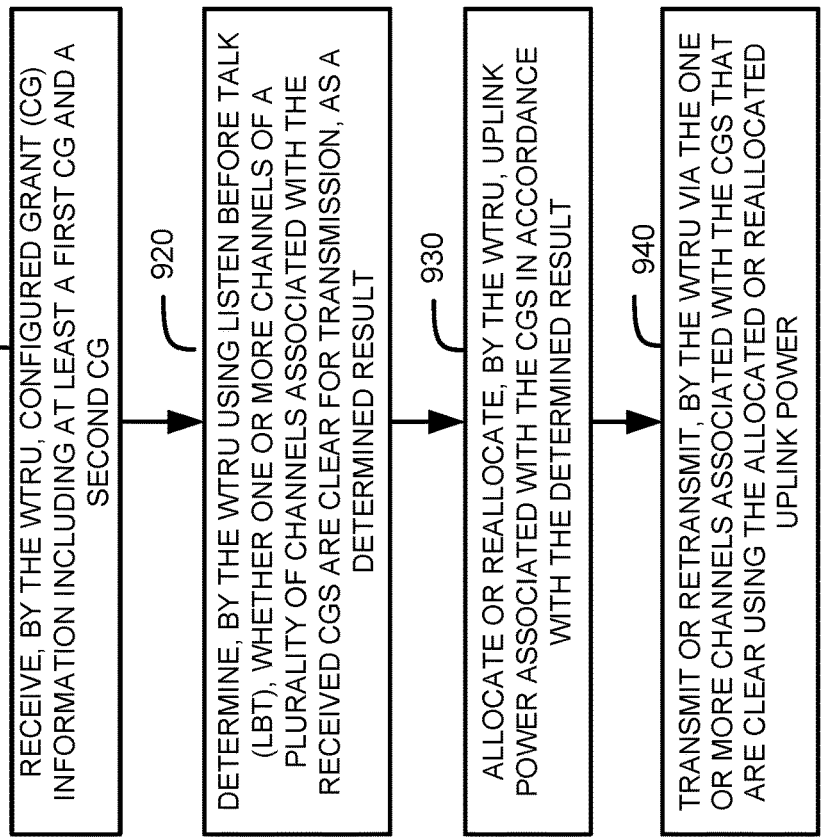
FIG. 9 is a flowchart illustrating a representative transmission procedure using allocated/reallocated UL power.

FIG. 9 is a flowchart illustrating a representative transmission procedure using allocated/reallocated UL power.

Referring to FIG. 9, the representative procedure 900 may include, at block 910, a WTRU 102 receiving Configured Grant (CG) information including at least a first CG and a second CG.

At block 920, the WTRU 102 may determine, using Listen Before Talk (LBT), whether one or more channels of a plurality of channels associated with the received CGs are clear for transmission, as a determined result. At block 930, the WTRU 102 may allocate or reallocate uplink power associated with the CGs in accordance with the determined result. At block 940, the WTRU 102 may transmit or retransmit via the one or more channels associated with the CGs that are clear using the allocated or reallocated uplink power.

In certain representative embodiments, the allocating or reallocating of the uplink power may include increasing or newly providing uplink power for transmission or retransmission over a component carrier (CC) of a plurality of CCs, on condition that an LBT fails on at least one CC of the plurality of CCs used by the WTRU 102 in a carrier aggregation mode.

FIG. 10 is a flowchart illustrating a still further representative procedure for transmission of a transport block.

Referring to FIG. 10, the representative procedure 1000 may include, at block 1010, a WTRU 102 transmitting, on a CG occasion associated with a first configured grant (CG), a transport block (TB) using resources associated with the first CG. At block 1020, the WTRU 102 may retransmit, on a CG occasion associated with the second CG, the TB using resources associated with the second CG. At block 1030, the WTRU 102 may toggle a new data indicator (NDI) at or prior to a further CG occasion associated with the second CG after an acknowledgment (ACK) is received. At block 1040, the WTRU 102 may transmit, on the further CG occasion associated with the second CG, a new TB using resources associated with the second CG.

In certain representative embodiments, the WTRU 102 may receive CG information including the first CG and the second CG.

In certain representative embodiments, the WTRU 102 may determine that a first timer has expired and/or may configure the WTRU 102 to retransmit using the second CG resources and the CG occasion associated with the second CG after the first timer has expired.

In certain representative embodiments, the WTRU 102 may receive downlink feedback information (DFI) including an acknowledgement (ACK) of successful transmission or successful retransmission of the TB, after the transmission or retransmission of the TB. As an example, the WTRU 102 may toggle an NDI in accordance with the ACK included in the received DFI.

In certain representative embodiments, the WTRU 102 may stop a second timer associated with the second CG in accordance with the ACK included in the received DFI.

In certain representative embodiments, the WTRU 102 may update a value of a CG timer associated with a selected CG for the retransmission of the TB for an applicable HARQ PID according to a periodicity for transmission or retransmission associated with the selected CG.

In certain representative embodiments, each of the CG occasion and the further CG occasion associated with the first and second CGs may be selected as any of: (1) a next CG occasion after a triggering event; or (2) a first available CG occasion after a backoff period ends.

In certain representative embodiments, the triggering event may be an indication received from a network entity.

In certain representative embodiments, for the retransmission, the WTRU 102 may select the second CG associated with resources on any of: (1) a different sub-band; (2) a different Listen Before Talk (LBT) bandwidth, (3) a different Bandwidth Part (BWP), and/or (4) a different uplink carrier.

As disclosed herein, the first and second timers may be any of: a CG timer and/or a retransmission timer.

FIG. 11 is a flowchart illustrating a representative transmission procedure using computed transmit power allocations.

Referring to FIG. 11, the representative procedure 1100 may include, at block 1110, a WTRU 102 receiving Configured Grant (CG) information including at least a first CG and a second CG. At block 1120, the WTRU 102 may determine using Listen Before Talk (LBT), whether one or more channels of a plurality of channels associated with the received CGs are clear for transmission, as a determined result. At block 1130, the WTRU 102 may compute transmit power allocations associated with the CGs in accordance with the determined result. At block 1140, the WTRU 102 may transmit or may retransmit via the one or more channels associated with the CGs that are clear using the computed transmit power allocations.

FIG. 12 is a flowchart illustrating a representative procedure for changing a redundancy version.

Referring to FIG. 12, the representative procedure 1200 may include, at block 1210, a WTRU 102 determining, using a Listen Before Talk (LBT) operation, that a channel is clear for transmission. At block 1220, the WTRU 102 may transmit or may retransmit, using a first configured grant (CG), a transport block (TB) using resources associated with the first CG. At block 1230, the WTRU 102 may receive an acknowledgment (ACK) or a negative ACK (NACK) regarding the transmission or retransmission of the TB. At block 1240, on condition that WTRU 102 performs a previous transmission or retransmission for which LBT was successful, the WTRU 102 may change a Redundancy Version (RV) associated with the retransmission of the TB for a next transmission or a next retransmission using the first CG or a further CG.

In certain representative embodiments, the changing of the RV may include any of incrementing an RV value, decrementing the RV value, resetting the RV value, and/or selecting the RV value based on a sequence or a pattern.

In certain representative embodiments, the WTRU 102 may select the further CG associated with resources on any of: (1) a different sub-band; (2) a different Liston Before Talk (LBT) bandwidth, (3) a different Bandwidth Part (BWP), and/or (4) a different uplink carrier. For example, the changing of the Redundancy Version (RV) associated with the transmission or the retransmission of the TB for a next transmission or a next retransmission using the further CG may include resetting a RV value to a predetermined value.

FIG. 13 is a flowchart illustrating a representative procedure for modification of CG occasions.

Referring to FIG. 13, the representative procedure 1300 may include, at block 1310, a WTRU 102 receiving modification information indicating a modification of one or more Configured Grant (CG) occasions. At block 1320, based on the received modification information, the WTRU 102 may any of: (1) add one or more CG occasions; (2) shift in time and/or frequency one or more upcoming CG occasions; and/or (3) remove one or more CG occasions.

FIG. 14 is a flowchart illustrating a representative procedure for CG configuration, CG occasion and/or CG resource selection.

Referring to FIG. 14, the representative procedure 1400 may include, at block 1410, a WTRU 102 receiving or obtaining a plurality of Configured Grant (CG) configurations associated with a plurality of CG occasions and a plurality of CG resources. At block 1420, the WTRU 102 may determine, using Listen Before Talk (LBT), whether one or more channels of a plurality of channels associated with the received CGs are clear for transmission, as an LBT determined result. At block 1430, the WTRU 102 may select a subset of the CG configurations, the CG occasions and/or the CG resources based on the LBT determined result, jittering delay to a next CG occasion or next CG occasions, and/or a reception of or a lack of reception of a downlink signal.

FIG. 15 is a flowchart illustrating a representative procedure for a CG transmission.

Referring to FIG. 15, the representative procedure 1500 may include, at block 1510, a WTRU 102 receiving, from a network entity, a Configured Grant (CG) for uplink resources. At block 1520, the WTRU 102 may, for a slot, map CG Uplink Control Information CG-UCI and data to the uplink resources for a CG transmission. At block 1530, the WTRU 102 may send, to the network entity, the CG transmission. The uplink resources associated with the CG-UCI may be transmitted prior to the uplink resources associated with the data.

In certain representative embodiments, the CG-UCI may be mapped to uplink resources adjacent to and/or closest to one or more Demodulation Reference Signals (DM-RSs).

In certain representative embodiments, the CG-UCI may be repeated in different uplink resources of the CG transmission.

In certain representative embodiments, the CG-UCI may be mapped to: (1) a fixed Physical Resource Block (PRB); and/or (2) a set of PRBs within an interlace.

In certain representative embodiments, the WTRU 102 may obtain and/or set an offset value to indicate an amount of resources that are reserved for the CG-UCI in the CG.

In certain representative embodiments, based on the offset value, the WTRU 102 may determine an amount of uplink resources reserved for the CG-UCI, for data and/or for regular UCI.

In certain representative embodiments, the WTRU 102 may multiplex the CG-UCI with regular UCI. For example, the mapping of the CG CG-UCI may include mapping the multiplexed CG-UCI and the regular UCI to the uplink resources of the slot. As another example, the WTRU 102 may map the data to remaining uplink resources for the CG transmission.

Systems and methods for processing data according to representative embodiments may be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method implemented by a wireless transmit and receive unit (WTRU),
the method comprising:
transmitting a first Transport Block (TB) associated with a Hybrid Automatic Repeat Request (HARQ) process using a first configured grant (CG) resource of at least one CG, wherein the first CG resource is associated with the HARQ process; and
starting a first CG timer associated with the HARQ process and a first CG retransmission timer associated with the HARQ process;
receiving HARQ feedback information associated with the HARQ process, wherein the received HARQ feedback information is associated with the first transport block;
stopping the first CG retransmission timer associated with the HARQ process, based on receiving HARQ feedback information;
stopping the first CG timer associated with the HARQ process, based on the received HARQ feedback information indicating acknowledgment; and
on condition that the first CG timer associated with the HARQ process is stopped and on condition that the first CG retransmission timer associated with the HARQ process is stopped, transmitting a second TB associated with a new data transmission using a second CG resource of the at least one CG, wherein the second CG resource is associated with the HARQ process.

2. The method of claim 1, further comprising:
determining a plurality of HARQ processes associated with CG resources; and
maintaining for each of the plurality of HARQ processes a CG timer and an CG retransmission timer.

3. The method of claim 2 wherein the first CG timer and the CG retransmission timer for a first HARQ process of the plurality of HARQ processes are different than the CG timer and the CG retransmission timer for a second HARQ process of the plurality of HARQ processes.

4. The method of claim 1, comprising:
on condition of receiving HARQ feedback information indicating acknowledgment, flushing a HARQ buffer associated with the HARQ process and toggling a New Data Indicator (NDI) associated with the HARQ process.

5. The method of claim 1, further comprising receiving a downlink control information (DCI) including the HARQ feedback information wherein the acknowledgment is indicating by a HARQ-ACK feedback value in a downlink feedback information (DFI) of the DCI.

6. The method of claim 1, wherein the first CG timer is stopped on condition of receiving the HARQ feedback information indicating acknowledgment, and wherein the CG retransmission timer is stopped on condition of receiving the HARQ feedback information indicating acknowledgment or negative acknowledgment.

7. A wireless transmit and receive unit (WTRU), the WTRU, comprising:
a processor;
a transceiver unit; and
a storage unit,
the processor operating with the transceiver unit and the storage unit configured to:
transmit a first Transport Block (TB) associated with a Hybrid Automatic Repeat Request (HARQ) process using a first configured grant (CG) resource of at least on CG, wherein the first CG resource being associated with the HARQ process; and
start a first CG timer associated with the HARQ process and a first CG retransmission timer associated with the HARQ process;
receive HARQ feedback information associated with the HARQ process, wherein the received HARQ feedback information is associated with the first transport block;

stop the first CG retransmission timer associated with the HARQ process, based on receiving HARQ feedback information;

stop the first CG timer associated with the HARQ process, based on receiving HARQ feedback information indicating acknowledgment; and on condition that the first CG timer associated with the HARQ process is stopped and on condition that the first CG retransmission timer associated with the HARQ process is stopped, transmit a second TB associated with a new data transmission using a second CG resource of the at least one CG, wherein the second CG resource is associated with the HARQ process.

8. The WTRU of claim 7, configured to:

determine a plurality of HARQ processes associated with CG resources; and maintain for each of the plurality of HARQ processes a CG timer and a CG retransmission timer.

9. The WTRU of claim 8 wherein the CG timer and the CG retransmission timer for a first HARQ process of the plurality of HARQ processes are different than the CG timer and the CG retransmission timer for a second HARQ process of the plurality of HARQ processes.

10. The WTRU of claim 7, configured to:

flush a HARQ buffer associated with the HARQ process and toggling a New Data Indicator (NDI) associated with the HARQ process, on condition of receiving HARQ feedback information indicating acknowledgment.

11. The WTRU of claim 7, configured to receive a downlink control information (DCI) including the HARQ feedback information wherein the acknowledgment is indicating by a HARQ-ACK feedback value in a downlink feedback information (DFI) of the DCI.

12. The WTRU of claim 7, wherein the first CG timer is stopped on condition of receiving the HARQ feedback information indicating acknowledgment, and wherein the CG retransmission timer is stopped on condition of receiving the HARQ feedback information indicating acknowledgment or negative acknowledgment.

* * * * *